(12) United States Patent
Kojima

(10) Patent No.: US 6,930,285 B2
(45) Date of Patent: Aug. 16, 2005

(54) FIRING FURNACE FOR PLASMA DISPLAY PANEL AND METHOD OF MANUFACTURING PLASMA DISPLAY PANEL

(75) Inventor: Kouji Kojima, Tokyo (JP)

(73) Assignee: Pioneer Plasma Display Corporation, Izumi (JP)

( * ) Notice: Subject to any disclaimer, the term of this patent is extended or adjusted under 35 U.S.C. 154(b) by 0 days.

(21) Appl. No.: 10/730,932

(22) Filed: Dec. 10, 2003

(65) Prior Publication Data

US 2004/0121697 A1 Jun. 24, 2004

(30) Foreign Application Priority Data

Dec. 11, 2002 (JP) ..................................... 2002-359938

(51) Int. Cl.[7] .............................. H01J 9/00; F27B 9/10
(52) U.S. Cl. ...................... 219/400; 219/388; 65/119; 432/152; 432/200
(58) Field of Search ............................ 219/388, 400; 432/11, 121, 152, 199, 200, 201; 445/24; 65/119, 160–162, 355, 356

(56) References Cited

U.S. PATENT DOCUMENTS

| | | | | |
|---|---|---|---|---|
| 3,476,542 A | * | 11/1969 | Ritter, Jr. ..................... | 65/119 |
| 4,888,038 A | * | 12/1989 | Herrington et al. ............ | 65/114 |
| 6,091,055 A | * | 7/2000 | Naka et al. ................. | 219/388 |
| 6,261,091 B1 | * | 7/2001 | Sakamoto et al. .......... | 432/121 |
| 6,776,008 B1 | * | 8/2004 | Vehmas et al. ............... | 65/119 |
| 6,845,633 B2 | * | 1/2005 | Vitkala ........................ | 65/119 |

FOREIGN PATENT DOCUMENTS

JP          11-25854          1/1999

* cited by examiner

Primary Examiner—Joseph Pelham
(74) Attorney, Agent, or Firm—Morgan, Lewis & Bockius LLP

(57) ABSTRACT

In a firing furnace of plasma display panel, gas distribution piping and gas exhaust piping each have a circular cross section and a uniform diameter along the longitudinal direction of those pipings. The gas distribution piping has a plurality of circular openings formed in a side face thereof and the openings are constructed such that the opening becomes larger in a stepwise fashion in a direction from both end portions to the central portion of the gas distribution piping. Furthermore, the gas exhaust piping has a plurality of elliptic openings formed in a side face thereof and the openings are constructed such that the opening becomes larger in a stepwise fashion in a direction from both end portions to the central portion of the gas exhaust piping.

24 Claims, 16 Drawing Sheets

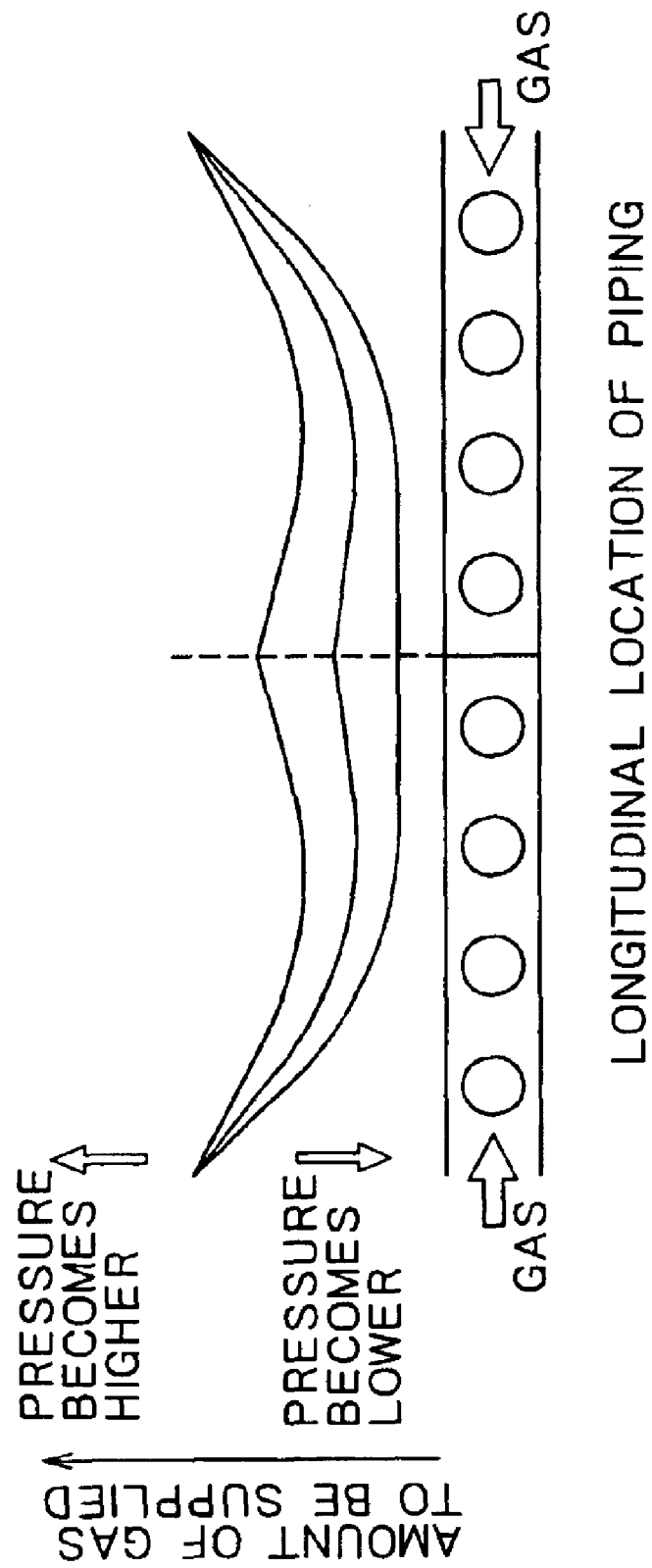

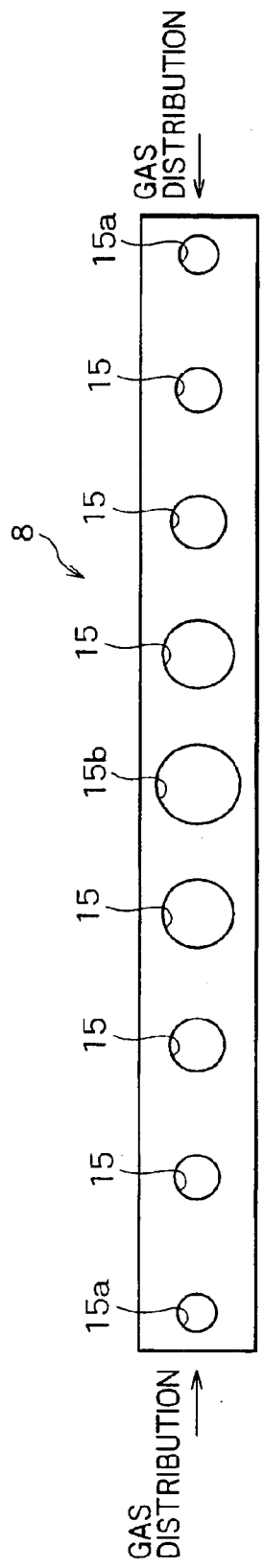
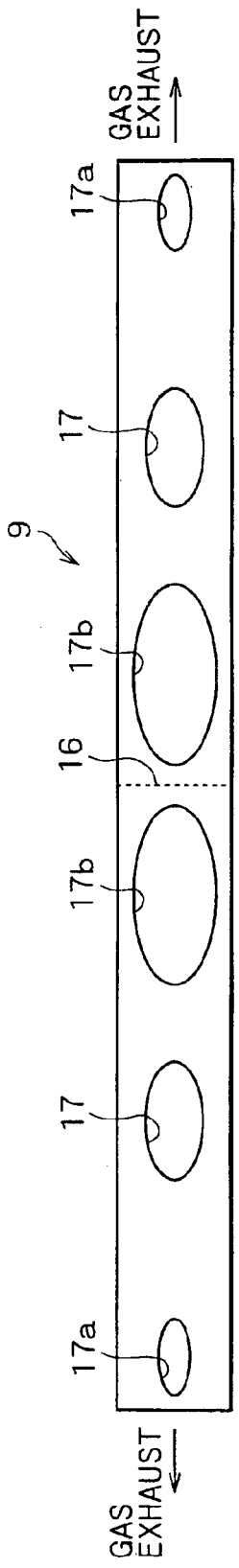
FIG. 7A
FIG. 7B

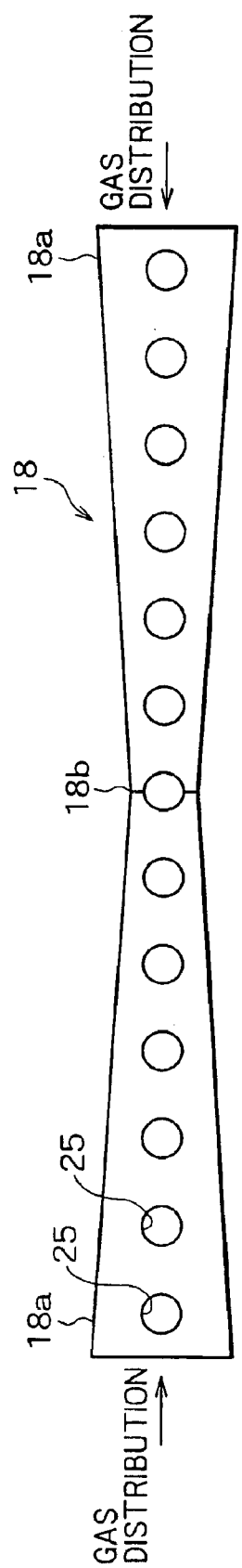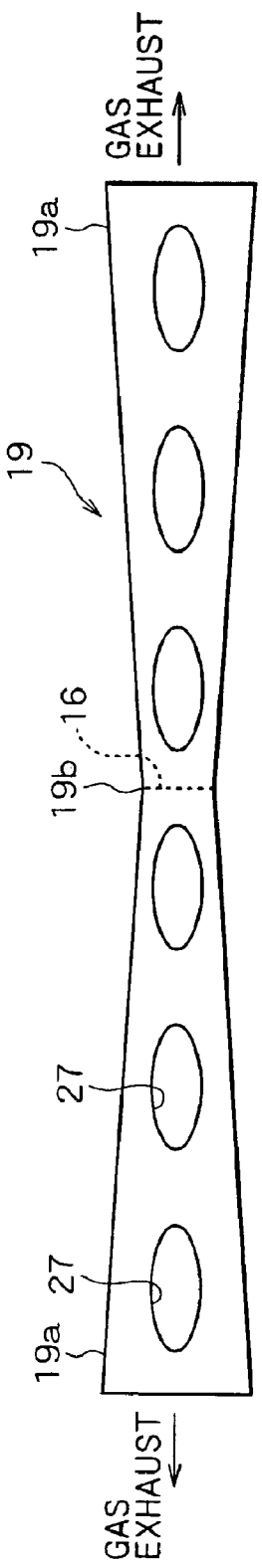

FIRING FURNACE FOR PLASMA DISPLAY PANEL AND METHOD OF MANUFACTURING PLASMA DISPLAY PANEL

BACKGROUND OF THE INVENTION

1. Field of the Invention

The present invention relates to a firing furnace for burning off binders within a paste layer and a method of manufacturing a plasma display panel using the firing furnace, and more particularly to a firing furnace intended to have the ability to uniformly supply gas containing oxygen to the inside of the firing furnace and a method of manufacturing a plasma display panel using the firing furnace.

2. Description of the Related Art

For example, as is disclosed in Japanese Patent Application No. 11(1999)-025854, a method of manufacturing a plasma display panel (hereinafter, referred to as PDP) includes: forming scanning electrodes and common electrodes on a substrate; forming a layer of a dielectric material and a protection layer of MgO over the scanning electrodes and common electrodes in order to form a front substrate; forming data electrodes on the other substrate; forming a layer of a dielectric material, barrier ribs and phosphor layers over the data electrodes in order to form a back substrate; and bonding the front substrate and back substrate to each other. Furthermore, in the individual steps including forming the aforementioned scanning electrodes and common electrodes, and forming the aforementioned layer of a dielectric material, barrier ribs and phosphor layers, a paste layer is formed on the substrate and then is fired by heat treatment.

FIG. 1 illustrates a schematic view of a conventional firing furnace for sequential processing and a chart diagram indicating temperature distribution in a furnace, in which axis of abscissas denotes substrate location within the firing furnace and axis of ordinate denotes substrate temperature. FIG. 2 is a partial cross sectional view illustrating the conventional firing furnace and FIG. 3A is a front view illustrating gas distribution piping of the conventional firing furnace, and FIG. 3B is a front view illustrating gas exhaust piping.

As shown in FIG. 1, the conventional firing furnace 101 for sequential processing comprises a temperature boosting section 102, temperature maintaining section 103 and cooling section 104, in which the individual sections each have a plurality of furnace compartments 105. Within the firing furnace 101, a substrate 111 of PDP is moved in a direction 112 passing through the temperature boosting section 102, temperature maintaining section 103 and cooling section 104 in this order. The temperature boosting section 102 is a section provided to boost the temperature of the substrate 111 from the room temperature to a firing temperature T and the temperature maintaining section 103 is a section provided to maintain the substrate 111 at the firing temperature T, and the cooling section 104 is a section provided to cool the substrate 111 from the firing temperature T to a lower temperature. The firing temperature T may typically be about 500 to 600° C. The adjacent furnace compartments 105 are coupled to each other through a connection path 110 (refer to FIG. 2). The connection path 110 is provided to allow the substrate 111 pass therethrough. The temperature boosting section 102 is configured so that the furnace compartment 105 located on the downstream side when viewing the substrate 111 in the direction 112 of movement of the substrate is set at higher temperatures. However, in some cases, a plurality of sequentially-arranged furnace compartments 105 may be set at the same temperature. Note that a furnace compartment 105a chosen out of the plurality of furnace compartments 105 and located nearest to the upstream side when viewing the substrate 111 in the direction 112 of movement of the substrate constitutes an entrance of the firing furnace 101 and faces a clean room (not shown). On the other hand, the cooling section 104 is configured so that the furnace compartment 105 located on the downstream side when viewing the substrate 111 in the direction of movement of the substrate is set at lower temperatures.

As shown in FIG. 2, the individual furnace compartments 105 each have a substrate carrier 106 provided therein. In this case, the substrate 111 is placed on a setter 107 and transported together with the setter 107 in the direction 112 by the substrate carrier 106. Furthermore, the individual furnace compartments 105 of the temperature boosting section 102 each have gas distribution piping 108 and gas exhaust piping 109 provided therein. Within each of the furnace compartments 105 of the temperature boosting section 102, the gas distribution piping 108 is located on the downstream side when viewing the substrate 111 in the direction 112 of movement of the substrate and the gas exhaust piping 109 is located on the upstream side. Furthermore, heated dry air 113 is supplied through the gas distribution piping 108 to heat a paste layer (not shown) provided on the surface of the substrate 111 and then almost all of the dry air 113 is exhausted by the gas exhaust piping 109. That is, a direction in which the dry air 113 is moved is opposite to the direction 112 as a whole and the dry air 113 is moved against the movement of the substrate 111. The dry air 113 is supplied at a supply rate (gas distribution rate) of about several tens meters per second, for example, about 20 meters per second. Additionally, the individual furnace compartments 105 each have provided therein a heating apparatus (not shown) for heating the substrate 111.

The substrate 111 is configured to have a paste layer formed on a glass substrate. The paste layer is made from powdered glass and vehicles which are made from resin binders and solvents. The binders would be, for example, resin binders such as nitrocellulose, ethylcellulose and acrylic, and the solvents would be, for example, terpinenol, acetic ester or the like.

Moreover, as shown in FIG. 3A, the gas distribution piping 108 is configured so that a plurality of equally-spaced openings 114 are formed along the longitudinal direction of the piping 108. The openings 114 each have a shape of circle and are the same in size. Furthermore, as shown in FIG. 3B, the gas exhaust piping 109 is configured so that a plurality of equally-spaced openings 115 are formed along the longitudinal direction of the piping 109. The openings 115 each have a shape of circle and are the same in size. The gas distribution piping 108 is configured so that the dry air 113 is supplied via both ends of the piping 108 and then is supplied through the openings 114 to the furnace compartments 105 and the gas exhaust piping 109 is configured so that the dry air 113 is sucked from within the furnace compartments 105 through the openings 115 and exhausted via both ends of the piping 109.

The substrate 111 transported from the clean room first passes through the furnace compartment 105a located nearest to the upstream side. Then, the substrate 111 passes sequentially through the individual furnace compartments 105 and thus passes through the temperature boosting section 102, temperature maintaining section 103 and cooling section 104 in this order. In the individual furnace compartments 105 of the temperature boosting section 102, the substrate 111 is heated by the heating apparatus and at the same time, exposed to the dry air 113 supplied through the gas distribution piping 108.

In the temperature boosting section 102, subjecting the substrate 111 to the heat treatment causes a part of the binders within the paste layer to be burned off, producing water and carbonic anhydride which, in turn, are carried away by the dry air 113. Moreover, the remaining binders within the paste layer and the solvents are not burned off but evaporated and then carried away by the dry air 113. This allows the binders and solvents (vehicle) to be eliminated from the paste layer and further allows the dry air 113 to become air (hereinafter, referred to as contaminated air) containing water, carbonic anhydride, binder component and solvent component. Thereafter, the temperature maintaining section 103 maintains the substrate 111 at the firing temperature T and fires the paste layer. Subsequently, the cooling section 104 cools the substrate 111 from the firing temperature to around the room temperature.

However, the above-described conventional techniques have the following problems. In recent years, as a PDP grows in size, a substrate for PDP also is growing in size. This increases the width of a firing furnace and the length of gas distribution piping laid within the firing furnace, causing difficulty of blowing dry air out uniformly through openings along the entire length of the gas distribution piping. As a result, one problem arises from the fact that variations in the degree to which the paste layer formed on the substrate of PDP is fired occur.

SUMMARY OF THE INVENTION

An object of the present invention is to provide a PDP firing furnace for allowing gas to be supplied uniformly through a plurality of openings arranged along the longitudinal direction of gas distribution piping and a method of manufacturing a plasma display panel using the firing furnace.

A PDP firing furnace according to the invention described in claim 1 is constructed such that a PDP firing furnace for firing a substrate of plasma display panel includes: gas distribution piping laid in one direction within said firing furnace and having a plurality of openings arranged along said one direction, the gas distribution piping being further configured so that gas containing oxygen is supplied via both end portions of the gas distribution piping and the gas is supplied to an inside of the firing furnace through the openings; and gas exhaust piping for exhausting gas from within the firing furnace. Furthermore, the firing furnace is constructed such that the openings become larger in directions from both end portions to a central portion of the gas distribution piping, or the gas distribution piping becomes finer in directions from both end portions to the central portion of the gas distribution piping.

When gas is supplied via both ends of the gas distribution piping, friction or the like between the gas and the inner wall of the piping impedes gas flow. Moreover, when the gas flows out through the openings, pressure and gas flow speed within the piping become lower in directions from both end portions to the central portion of the piping. As a result, when the openings of the same size are arranged at equal intervals in the longitudinal direction of the piping, the amounts of gas blowing out through the openings disposed nearer to the central portion of the piping in the longitudinal direction of the piping become smaller.

FIG. 4 is a schematic view illustrating relationship between longitudinal location of the gas distribution piping and the amount of gas to be supplied by the piping within the conventional firing furnace, in which axis of abscissas denotes longitudinal location of piping and axis of ordinate denotes the amount of gas per unit time to be supplied through the piping. Note that the gas distribution piping shown in FIG. 4 is configured so that gas is supplied via both ends of the piping to the inside of the piping and a separator plate is provided in the central portion of the piping along the longitudinal direction thereof. As shown in FIG. 4, when gas pressure is high, pressure is slightly increased in the central portion of the piping, increasing the amount of gas to be supplied, however, as a whole, the amount of gas to be supplied becomes smaller at locations nearer to the central portion of the piping along the longitudinal direction thereof. Accordingly, even when the amount of gas to be supplied to the piping is adjusted, it is difficult to equalize the amount of gas to be supplied through the piping in the longitudinal direction of the piping.

In contrast, the firing furnace of the invention is constructed such that the opening is made larger in directions from both end portions to the central portion of the gas distribution piping in order to compensate for the lowering of pressure and gas flow speed in the central portion of the piping, allowing the amounts of gas blowing out through the individual openings to become equal to one another. Alternatively, the firing furnace of the invention is constructed such that the gas distribution piping becomes finer in directions from both end portions to the central portion of the gas distribution piping in order to compensate for the lowering of pressure in the central portion of the piping and then keep pressure within the piping constant in the longitudinal direction of the piping, allowing the speeds and amounts of gas flowing out through the individual openings to become equal to one another. As a result, the amount of gas to be supplied to the inside of the firing furnace becomes uniform in the longitudinal direction of the gas distribution piping, preventing occurrence of variations in the degree to which the paste layer formed on the substrate of PDP is fired.

A PDP firing furnace according to the invention described in claim 3 is constructed such that a PDP firing furnace for firing a substrate of plasma display panel includes: gas distribution piping laid in one direction within the firing furnace and having a plurality of openings arranged along the one direction, the gas distribution piping being further constructed such that gas containing oxygen is supplied via both end portions of the gas distribution piping and the gas is supplied to an inside of the firing furnace through the openings; and gas exhaust piping for exhausting gas from within the firing furnace. Furthermore, the firing furnace is constructed such that the openings formed between both end portions and a central portion of the gas distribution piping are larger than the openings formed in the both end portions and central portion, or portions of the gas distribution piping between the both end portions and central portion become finer than the both end portions and central portion of the gas distribution piping.

As shown in FIG. 4, when the flow amount of gas to be supplied to both end portions of the gas distribution piping is large or the flow speed of gas to be supplied to both end portions of the gas distribution piping is high, the gas having flowed from both end portions of the gas distribution piping to the inside of the piping collides in the central portion, potentially increasing the pressure in the central portion and the flow amount and flow speed of gas flowing out through the openings formed in the central portion. In this case, the flow amount and flow speed of gas blowing out through the openings formed in portions between the central portion and both end portions of the gas distribution piping become smaller than the flow amount and flow speed of gas blowing out through the openings formed in the central portion and both end portions.

In the invention, since the openings formed in portions between both end portions and the central portion of the gas distribution piping are made larger than the openings formed in both end portions and the central portion of the gas distribution piping to compensate for the lowering of pressure and gas flow speed in the portions between the central portion and both end portions of the piping by increasing the size of the openings, allowing the amounts of gas blowing out through the individual openings to become equal to one another. Alternatively, the gas distribution piping is constructed such that the portions between both end portions and the central portion of the gas distribution piping are made finer than both end portions and the central portion thereof to compensate for the lowering of pressure and gas flow speed in the portions between the central portion and both end portions and then keep pressure within the piping constant in the longitudinal direction of the piping, allowing the speeds and amounts of gas blowing out through the individual openings to become equal to one another. As a result, the amount of gas to be supplied to the inside of the firing furnace becomes uniform in the longitudinal direction of the gas distribution piping.

A PDP firing furnace according to the invention described in claim 5 is constructed such that a PDP firing furnace for firing a substrate of plasma display panel includes: gas distribution piping laid in one direction within the firing furnace and having a plurality of openings arranged along the one direction, the gas distribution piping being further constructed such that gas containing oxygen is supplied via one end portion of the gas distribution piping and the gas is supplied to an inside of the firing furnace through the openings; and gas exhaust piping for exhausting gas from within the firing furnace. Furthermore, the firing furnace is constructed such that the openings become larger in directions from both end portions of the gas distribution piping to a portion between the both end portions, or the gas distribution piping becomes finer in directions from both end portions of the gas distribution piping to the portion between the both end portions.

A PDP firing furnace according to the invention described in claim 7 is constructed such that a PDP firing furnace for firing a substrate of plasma display panel includes: gas distribution piping for supplying gas containing oxygen to an inside of the firing furnace; and gas exhaust piping laid in one direction within the firing furnace and having a plurality of openings arranged along the one direction, the gas exhaust piping being further constructed such that gas is exhausted via both end portions of the gas exhaust piping to exhaust gas from within the firing furnace through the openings. Furthermore, the firing furnace is constructed such that the openings become larger in directions from both end portions to a central portion of the gas exhaust piping, or the gas exhaust piping becomes finer in directions from both end portions to the central portion of the gas exhaust piping.

When gas is exhausted via the both end portions of the gas exhaust piping, since the gas flows inside the piping through the openings, pressure difference between the inside and outside of the gas exhaust piping becomes smaller in directions from both end portions to the central portion of the piping and flow speed of the gas passing through the openings becomes lower in directions from both end portions to the central portion of the piping. As a result, when the openings of the same size are arranged at equal intervals along the longitudinal direction of the piping, the amount of gas passing through the opening located nearer to the central portion of the piping in the longitudinal direction of the piping becomes smaller. As a result, the amounts of gas to be exhausted from the firing furnace become uneven in the longitudinal direction of the gas exhaust piping, causing variations in the degree to which the PDP is fired.

In the invention, since the openings are configured so that the opening becomes larger in directions from both end portions to the central portion of the gas exhaust piping, the lowering of pressure difference and gas flow speed in the central portion of the piping are compensated for, allowing the amounts of the gas to be exhausted through the individual openings to become equal to one another. Alternatively, since the gas exhaust piping becomes finer in directions from both end portions to the central portion of the gas exhaust piping, the lowering of pressure difference and gas flow speed in the central portion of the piping are compensated for, allowing the amounts of the gas to be exhausted through the individual openings to become equal to one another. As a result, the amount of gas to be exhausted from within the firing furnace becomes uniform in the longitudinal direction of the gas exhaust piping, preventing occurrence of variations in the degree to which the paste layer formed on the substrate of PDP is fired.

A PDP firing furnace according to the invention described in claim 9 is constructed such that a PDP firing furnace for firing a substrate of plasma display panel includes: gas distribution piping for supplying gas containing oxygen to an inside of the firing furnace; and gas exhaust piping laid in one direction within the firing furnace and having a plurality of openings arranged along the one direction, the gas exhaust piping being further constructed such that gas is exhausted via both end portions of the gas exhaust piping to exhaust gas from within the firing furnace through the openings. Furthermore, the firing furnace is constructed such that the openings formed between both end portions and a central portion of the gas exhaust piping are larger than the openings formed in the both end portions and central portion, or portions of the gas exhaust piping between the both end portions and central portion are finer than the both end portions and central portion of the gas exhaust piping.

A PDP firing furnace according to the invention described in claim 11 is constructed such that a PDP firing furnace for firing a substrate of plasma display panel includes: gas distribution piping for supplying gas containing oxygen to an inside of the firing furnace; and gas exhaust piping laid in one direction within the firing furnace and having a plurality of openings arranged along the one direction, the gas exhaust piping being further constructed such that gas is exhausted via both end portions of the gas exhaust piping to exhaust gas from within the firing furnace through the openings. Furthermore, the firing furnace is constructed such that the openings become larger in directions from both end portions of the gas exhaust piping to a portion between the both end portions, or the gas exhaust piping becomes finer in directions from both end portions of the gas exhaust piping to the portion between the both end portions.

A PDP firing furnace according to the invention described in claim 13 is constructed such that a PDP firing furnace for firing a substrate of plasma display panel includes: gas distribution piping laid in one direction within the firing furnace and having a plurality of openings arranged along the one direction, the gas distribution piping being further constructed such that gas containing oxygen is supplied via one end portion of the gas distribution piping and the gas is supplied to an inside of the firing furnace through the openings; and gas exhaust piping for exhausting gas from within the firing furnace. Furthermore, the firing furnace is constructed such that the openings become larger in directions from both end portions of the gas distribution piping to a portion between the both end portions, or the gas distribution piping becomes finer in directions from both end portions of the gas distribution piping to the portion between the both end portions.

Conventionally, a gas distribution piping system for supplying gas to gas distribution piping has been disposed on both sides of firing furnace. Accordingly, when a maintenance worker performs maintenance operation on a firing furnace, the worker needs to remove the gas distribution piping system, taking a lot of time and labor. In addition, providing the gas distribution piping systems on both sides of firing furnace increases the volume of firing furnace and further the investment cost of firing furnace.

In the invention, gas is supplied via the one end portion of the gas distribution piping to the inside of the piping. This eliminates the conventional need to provide gas distribution piping systems on both sides of the firing furnace and allows the firing furnace to have a gas distribution piping system provided only on one side of the firing furnace. As a result, maintenance operation of firing furnace can be facilitated and further the firing furnace can be made compact, and investment cost of firing furnace can be reduced.

Furthermore, when gas is supplied only via the one end portion of the gas distribution piping, the gas flows out through the openings provided in the halfway of the piping during its travel from the end portion, to which the gas is supplied, to the other end portion and therefore, pressure loss occurs. On the other hand, pressure tends to be increased within the piping because the gas supplied impinges on a pipe end in the other end portion. As a consequence, pressure within the gas distribution piping once becomes lower in a direction from the one end portion, to which the gas is supplied, to the other end portion and becomes lowest in the certain portion between the both end portions, and becomes higher in a direction from the certain portion to the other end portion. In the invention, the gas distribution piping is configured so that the opening is made larger in directions from both end portions to the certain portion between both end portions of the gas distribution piping in order to compensate for the lowering of pressure in the certain portion between both end portions, allowing the amounts of gas blowing out through the individual openings to become equal to one another. Alternatively, the gas distribution piping is configured so that the gas distribution piping becomes finer in directions from both end portions of the gas distribution piping to the certain portion between both end portions in order to compensate for the lowering of pressure in the certain portion between both end portions, allowing the amounts of gas blowing out through the individual openings to become equal to one another. As a result, the amount of gas to be supplied to the inside of the firing furnace becomes uniform in the longitudinal direction of the gas distribution piping.

A PDP firing furnace according to the invention described in claim 14 is constructed such that a PDP firing furnace for firing a substrate of plasma display panel includes: gas distribution piping for supplying gas containing oxygen to an inside of the firing furnace; and gas exhaust piping laid in one direction within the firing furnace and having a plurality of openings arranged along the one direction, the gas exhaust piping being further constructed such that gas is exhausted via one end portion of the gas exhaust piping to exhaust gas from within the firing furnace through the openings. Furthermore, the firing furnace is constructed such that the openings become larger in a direction from the one end portion, through which the gas is exhausted, to the other end portion of the gas exhaust piping, or the gas exhaust piping becomes finer in a direction from the one end portion, through which the gas is exhausted, to the other end portion of the gas exhaust piping.

Conventionally, a gas exhaust piping system for exhausting gas from gas exhaust piping has been disposed on both sides of firing furnace. Accordingly, when a maintenance worker performs maintenance operation on a firing furnace, the worker needs to remove the gas exhaust piping system, taking a lot of time and labor. In addition, providing the gas exhaust piping systems on both sides of firing furnace increases the volume of firing furnace and further the investment cost of firing furnace.

In the invention, gas is exhausted via the one end portion of the gas exhaust piping. This eliminates the conventional need to provide gas exhaust piping systems on both sides of the firing furnace and allows the firing furnace to have a gas exhaust piping system provided only on one side of the firing furnace. As a result, maintenance operation of firing furnace can be facilitated and further the firing furnace can be made compact, and investment cost of firing furnace can be reduced.

Furthermore, when gas is exhausted only via the one end portion of the gas exhaust piping, the gas flows inside the piping through the individual openings and therefore, pressure difference between the inside and outside of the piping becomes smaller in a direction from the one end portion to the other end portion of the gas exhaust piping. In the invention, since the gas exhaust piping is configured so that the opening becomes larger in a direction from the one end portion, through which the gas within the gas exhaust piping is exhausted, to the other end portion, the lowering of pressure difference in the other end portion compensates for the lowering of the amount of gas, which flows inside the piping through the openings and then is to be exhausted, by increasing the size of the openings, allowing the amounts of gas to be exhausted through the individual openings to become equal to one another. Alternatively, the gas exhaust piping is configured so that the gas exhaust piping becomes finer in a direction from the one end portion, through which the gas is exhausted, to the other end portion in order to compensate for the lowering of pressure difference in the other end portion, allowing the amounts of gas to be exhausted through the individual openings to become equal to one another. As a result, the amount of gas to be exhausted from within the firing furnace becomes uniform in the longitudinal direction of the gas exhaust piping.

A method of manufacturing a plasma display panel according to the invention described in claim 17 includes the steps of: forming a paste layer made of a transparent conductive material on a first substrate and firing the paste layer to form a transparent electrode; forming a paste layer made of a transparent dielectric material over the transparent electrode and firing the paste layer to form a transparent dielectric layer; forming electrodes on a second substrate; the step of forming a paste layer made of a dielectric material over the electrodes and firing the paste layer to form a dielectric layer; forming a paste layer made of a barrier rib material on the dielectric layer and firing the paste layer to form barrier ribs; and forming a paste layer made of a phosphor material on at least one of the dielectric layer and side faces of the barrier ribs and firing the paste layer to form phosphor layers. Furthermore, the method is constructed such that in at least one of the step of forming the transparent electrode, the step of forming the transparent dielectric layer, the step of forming the dielectric layer, the step of forming the barrier ribs, and the step of forming the phosphor layers, the firing of the paste layer is carried out within any one of the firing furnaces constructed in accordance with the aforementioned invention.

According to the invention, the PDP firing furnace is constructed such that the opening is made larger in directions from both end portions to the central portion of the gas distribution piping to supply gas uniformly through the plurality of openings arranged along the longitudinal direction of the gas distribution piping. As a result, the amount of gas to be supplied to the inside of the firing furnace becomes uniform in the longitudinal direction of the gas distribution piping, preventing occurrence of variations in the degree to which the paste layer formed on the substrate of PDP is fired.

BRIEF DESCRIPTION OF THE DRAWINGS

FIG. 4 is a schematic view illustrating relationship between longitudinal location of the gas distribution piping and the amount of gas to be supplied by the piping within the conventional firing furnace, in which axis of abscissas denotes longitudinal location of piping and axis of ordinate denotes the amount of gas per unit time to be supplied through the piping;

FIG. 7A is a front view illustrating gas distribution piping and FIG. 7B is a front view illustrating gas exhaust piping;

FIG. 8A is a front view illustrating gas distribution piping of a firing furnace according to a second embodiment and FIG. 8B is a front view illustrating gas exhaust piping of the firing furnace according to the embodiment;

DETAILED DESCRIPTION OF THE PREFERRED EMBODIMENTS

Figure 1:
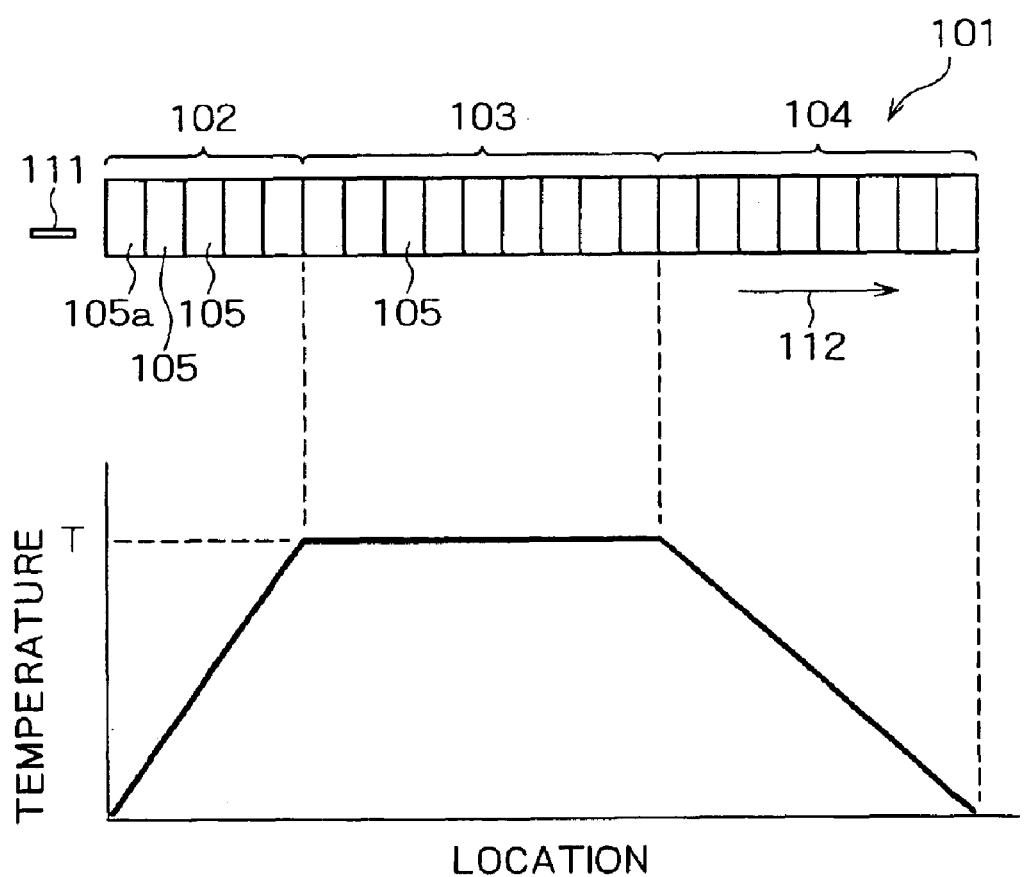
FIG. 1 illustrates a schematic view of a conventional firing furnace for sequential processing and a chart diagram indicating temperature distribution in a furnace, in which axis of abscissas denotes substrate location within the firing furnace and axis of ordinate denotes substrate temperature.
Figure 2:
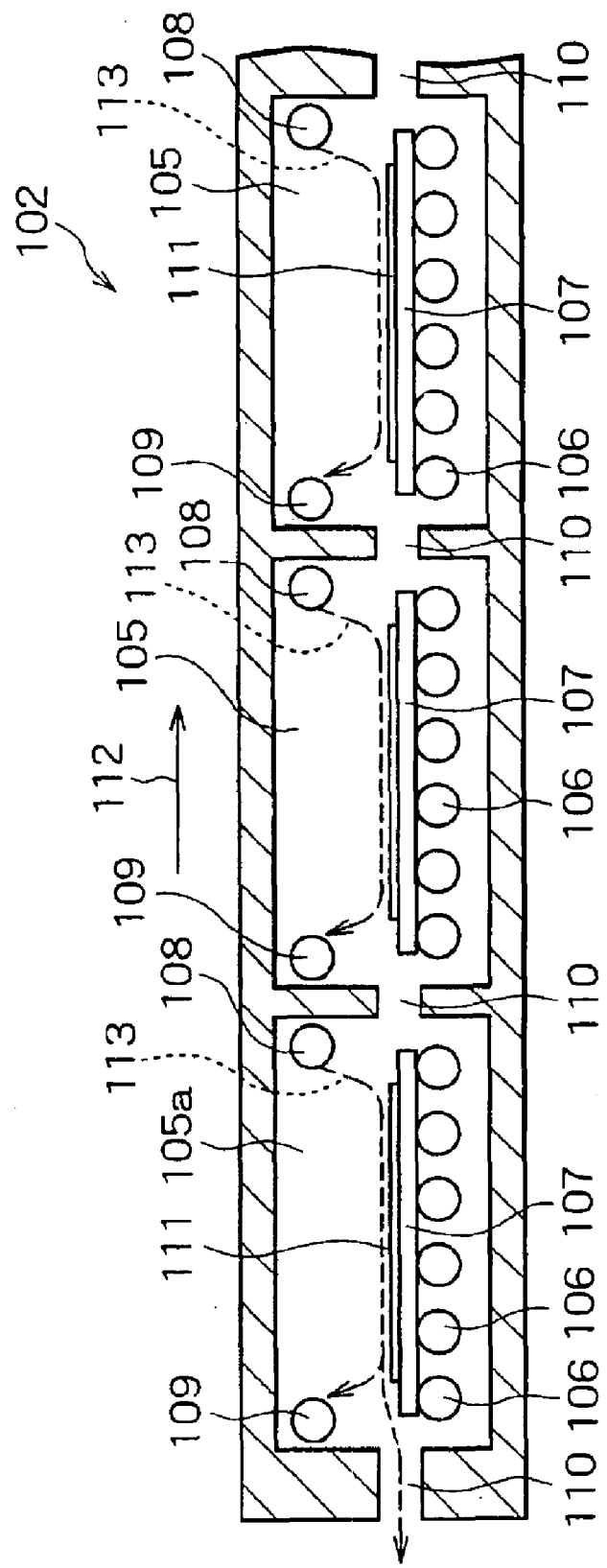
FIG. 2 is a partial cross sectional view illustrating the conventional firing furnace.
Figure 3A:
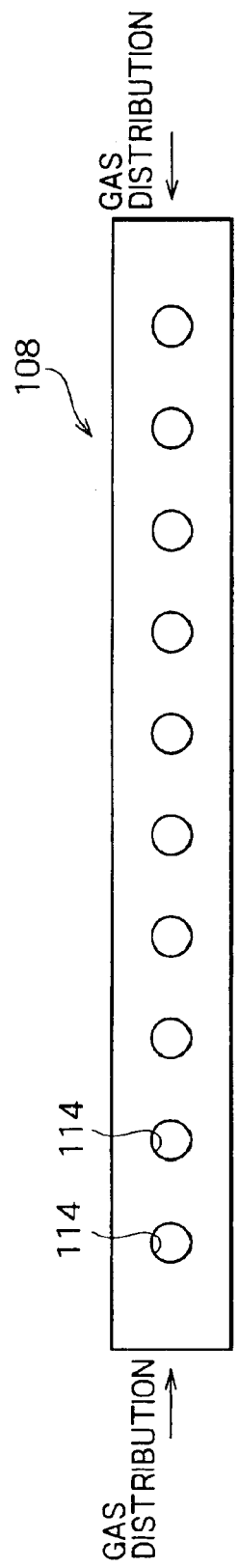
FIG. 3A is a front view illustrating gas distribution piping of the conventional firing furnace and FIG. 3B is a front view illustrating gas exhaust piping thereof.
Figure 3B:
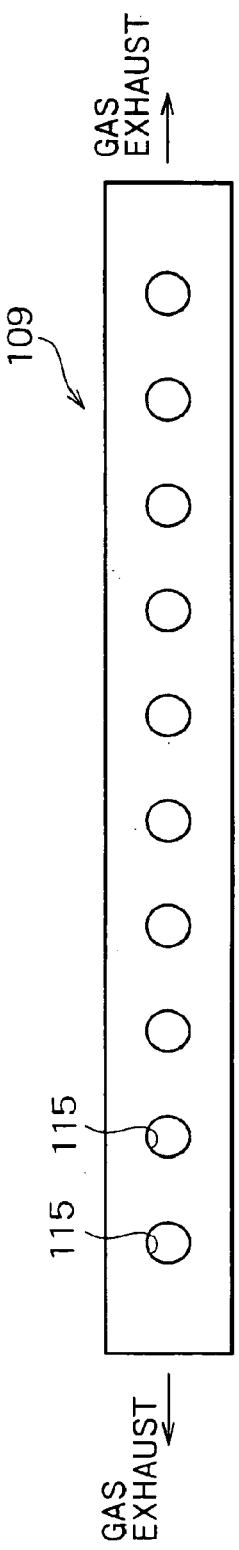
Figure 5:
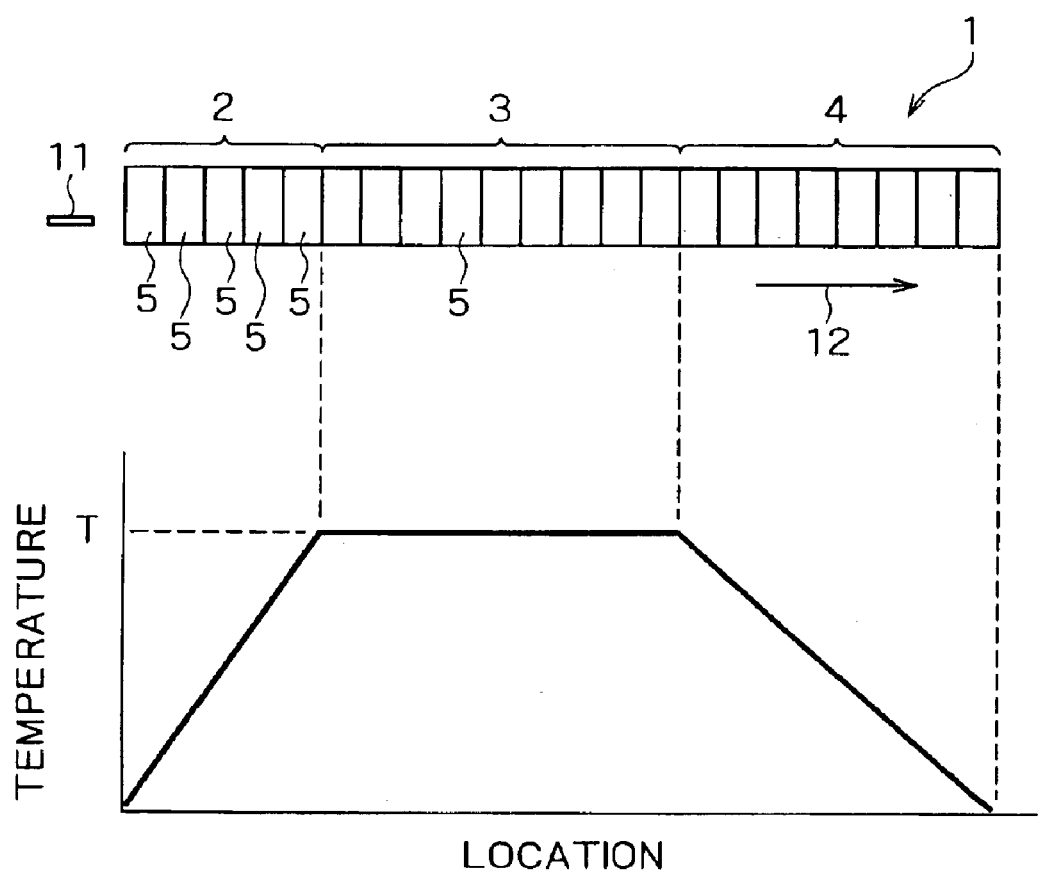
FIG. 5 illustrates a schematic view of a firing furnace for sequential processing according to a first embodiment and a chart diagram indicating how substrate temperature varies along the firing furnace, in which axis of abscissas denotes substrate location within the firing furnace and axis of ordinate denotes substrate temperature.
Figure 6:
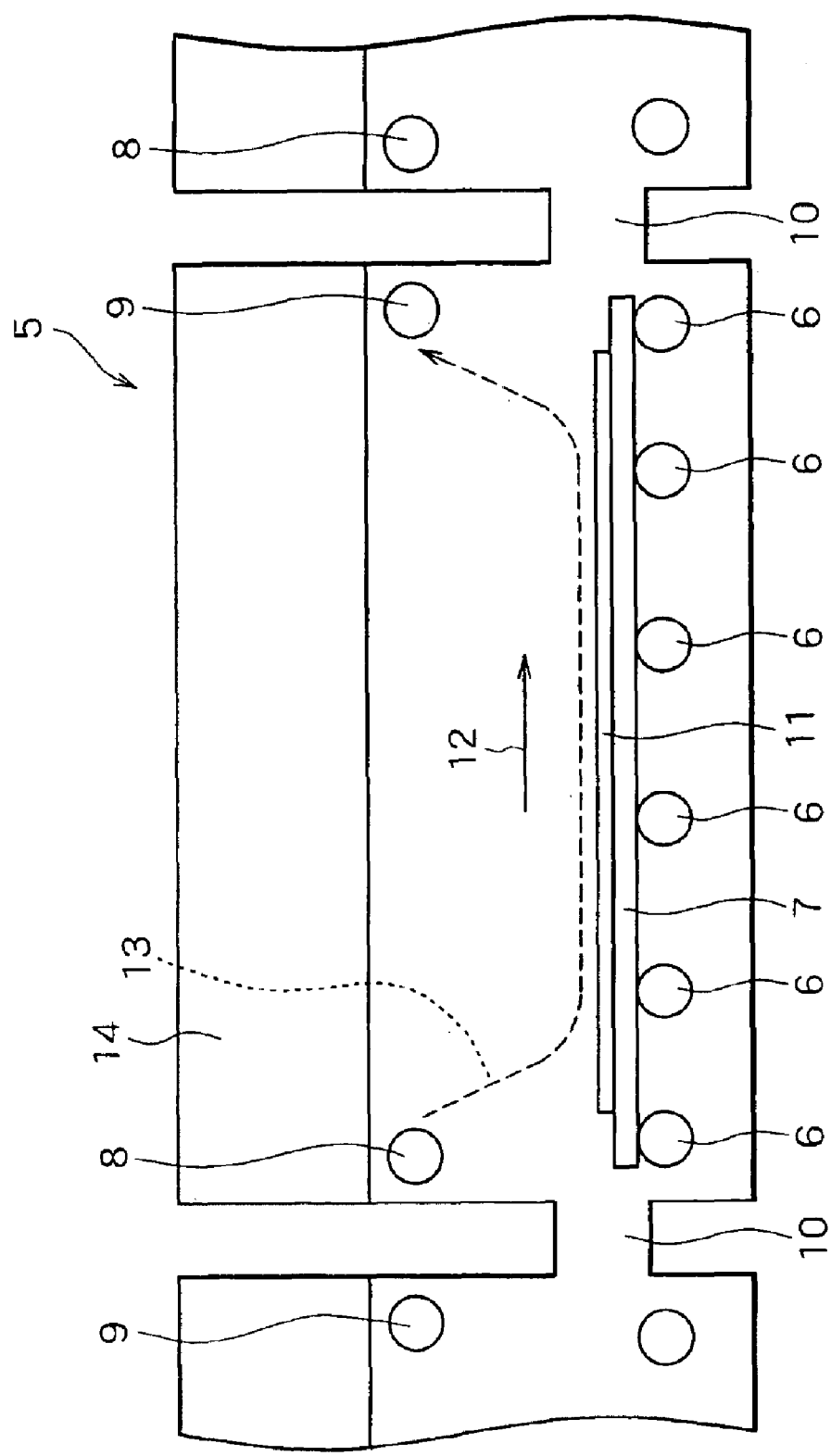
FIG. 6 is a schematic cross sectional view illustrating individual furnace compartments of the firing furnace.

Embodiments of the present invention will be explained in detail below with reference to the accompanying drawings. First, a first embodiment of the invention will be explained. FIG. 5 illustrates a schematic view of a firing furnace for sequential processing according to the embodiment and a chart diagram indicating how substrate temperature varies along the firing furnace, in which axis of abscissas denotes substrate location within the firing furnace and axis of ordinate denotes substrate temperature. FIG. 6 is a schematic cross sectional view illustrating individual furnace compartments of the firing furnace and FIG. 7A is a front view illustrating gas distribution piping, and FIG. 7B is a front view illustrating gas exhaust piping.

A firing furnace 1 according to the embodiment is a firing furnace for sequential processing used in individual firing steps in a manufacturing process for PDP. AS shown in FIG. 5, the firing furnace 1 comprises a temperature boosting section 2, temperature maintaining section 3 and cooling section 4, in which the individual sections each have a plurality of furnace compartments 5. The temperature boosting section 2 has, for example, five furnace compartments 5 arranged in a line. Within the firing furnace 1, a front substrate or back substrate (hereinafter, referred to generally as a substrate 11) constituting a PDP is moved in a direction 12 passing through the temperature boosting section 2, temperature maintaining section 3 and cooling section 4 in this order. The temperature boosting section 2 is a section provided to boost the temperature of the substrate 11 from the room temperature to a firing temperature T and the temperature maintaining section 3 is a section provided to maintain the substrate 11 at the firing temperature T, and the cooling section 4 is a section provided to cool the substrate 11 from the firing temperature T to a lower temperature. The firing temperature T may typically be about 500 to 600° C.

The adjacent furnace compartments 5 are coupled to each other through a connection path 10 (refer to FIG. 6). The connection path 10 is provided to allow the substrate 11 pass therethrough. The temperature boosting section 2 is configured so that the furnace compartment 5 located nearer to the downstream side when viewing the substrate 11 in the direction 12 of movement of the substrate is set at higher temperatures and the furnace compartments 5 within the temperature maintaining section 3 are set at the firing temperature T. However, in some cases, a plurality of sequentially-arranged furnace compartments 5 may be set at the same temperature. Note that the furnace compartment 5 located nearest to the upstream side constitutes an entrance of the firing furnace 1 and faces a clean room (not shown).

On the other hand, the cooling section 4 is configured so that the furnace compartment 5 located nearer to the downstream side when viewing the substrate 11 in the direction 12 of movement of the substrate is set at lower temperatures.

As shown in FIG. 6, the individual furnace compartments 5 each have substrate carriers 6 provided therein. In this case, the substrate 11 is placed on a setter 7 and transported together with the setter 7 in the direction 12 by the carriers 6 so as to pass sequentially through the individual furnace compartments 5. Furthermore, the individual furnace compartments 5 each have a heating apparatus 14 for heating the substrate 11, which apparatus is provided in a position above a pathway for the substrate 11. Note that the heating apparatus 14 may be provided below the pathway for the substrate 11, or the heating apparatuses 14 may be provided both above and below the pathway for the substrate 11.

Furthermore, the individual furnace compartments 5 within the temperature boosting section 2 each have one gas distribution piping 8 and one gas exhaust piping 9 provided therein, in which both of the pipings extend in a direction (hereinafter, referred to as a width direction) orthogonal to the direction 12. Note that the individual furnace compartments 5 each may have not less than two gas distribution pipings 8 and/or not less than two gas exhaust pipings 9 provided therein. Within each of the furnace compartments 5, for example, the gas distribution piping 8 is located on the upstream side when viewing the substrate 11 in the direction 12 of movement of the substrate and the gas exhaust piping 9 is located nearer to the downstream side than the gas distribution piping 8. Note that the above-stated positional relationship between the gas distribution piping 8 and the gas exhaust piping 9 may be inverted. Both end portions of the gas distribution piping 8 are coupled to a dry air supplier (not shown) through gas distribution piping systems (not shown) provided on both sides of the firing furnace 1 and both end portions of the gas exhaust piping 9 are coupled to a gas exhaust pump (not shown) through gas exhaust piping systems (not shown) provided on both sides of the firing furnace 1.

The gas distribution piping 8 and gas exhaust piping 9 each have a circular cross section whose diameter is the same in the longitudinal direction of piping. That is, the gas distribution piping 8 and gas exhaust piping 9 are straight piping. As shown in FIG. 7A, the gas distribution piping 8 has a plurality of openings 15 provided in a side face thereof. The openings 15 each have a shape of circle and are arranged at approximately equal intervals in a line in the longitudinal direction of the gas distribution piping 8. The openings 15 are formed, for example, on the downstream side, i.e., in a face of the gas distribution piping 8, which face opposes the gas exhaust piping 9. The openings 15 are constructed such that the opening becomes larger in a stepwise fashion in directions from both end portions to the central portion of the gas distribution piping 8 and therefore, the opening 15b formed in the central portion is larger than the openings 15a formed in both end portions thereof.

Furthermore, as shown in FIG. 7B, the gas exhaust piping 9 has a separator plate 16 provided in the central portion thereof. The separator plate 16 is provided to divide the inside of the gas exhaust piping 9 into two portions and a gap (not shown) is formed between the separator plate 16 and the inner wall of the gas exhaust piping 9. Note that the gap may not be formed therebetween. Furthermore, a plurality of openings 17 are formed in a side face of the gas exhaust piping 9 so as to face the gas distribution piping 8, which side face is located on the upstream side. The openings 17 are constructed such that the opening becomes larger in a stepwise fashion in directions from both end portions to the central portion of the gas exhaust piping 9. That is, the opening 17b located in the central portion of the gas exhaust piping 9 is larger than the openings 17a located in both end portions thereof. The openings 17 each have a shape of, for example, ellipse.

Detailed dimensions of individual parts of the firing furnace 1 will be shown below. Note that numerical values shown below are exemplary and the invention is not limited to those numerical values. The firing furnace 1 would be, for example, 29.7 meters in length overall and the firing furnace 1 would be, for example, 2000 millimeters wide. The number of furnace compartments 5 would be, for example, twenty-two and five out of the twenty-two furnace compartments 5 constitute the temperature boosting section 2, and nine out of them constitute the temperature maintaining section 3, and further, eight out of them constitute the cooling section 4. The individual furnace compartments 5 each would have a length of, for example, 1350 millimeters in the direction 12 of movement of substrate. The gas distribution piping 8 and gas exhaust piping 9 each would have a diameter of, for example, 35 millimeters and a length of, for example, 1900 millimeters. The opening 15 of the gas distribution piping 8 would have a diameter of, for example, 10 to 20 millimeters. That is, the opening 15a would have a diameter of, for example, 10 millimeters and the opening 15b would have a diameter of, for example, 20 millimeters, and the openings 15 would be arranged at equal intervals of 50 millimeters. The opening 17 of the gas exhaust piping 9 would have a minor diameter of, for example, 10 to 20 millimeters. That is, the opening 17a would have a minor diameter of, for example, 10 millimeters and the opening 17b would have a minor diameter of, for example, 20 millimeters. The opening 17 would have a major diameter, for example, ten times the minor diameter. The openings 17 would be arranged at equal intervals of 50 millimeters. Furthermore, the substrate carriers 6 would transport the setter 7 and substrate 11 at a transport speed of, for example, 450 millimeters per minute and the setter 7 would be, for example, 1600 millimeters wide, for example, 1200 millimeters long, for example, 5 millimeters thick, and the substrate 11 would be, for example, 1500 millimeters wide, for example, 1000 millimeters long, for example, 3 millimeters thick.

Next, how to use the firing furnace constructed as described above and in accordance with the embodiment, i.e., a method provided to manufacture a PDP and including firing a PDP substrate will be explained. First, scanning electrodes and common electrodes are formed in an alternate fashion and in parallel with one another on a glass substrate. In the formation of the scanning electrodes and common electrodes, first, a paste layer made of a transparent conductive material is formed and fired to form a transparent electrode. How to fire the paste layer will be described later. Then, bus electrodes are formed, resulting in formation of the scanning electrodes and common electrodes. Thereafter, a paste layer of a transparent dielectric material is formed so as to cover the scanning electrodes and common electrodes, and fired to form a layer of a transparent dielectric material. A protection layer of MgO is deposited thereon. Thus, a front substrate is prepared.

Subsequently, data electrodes are formed on the other glass substrate and a paste layer of a dielectric material is formed so as to cover the data electrodes, and the paste layer is fired to form a dielectric layer. Thereafter, a paste layer for barrier ribs is formed and dried, and then, fired to form barrier ribs. Then, paste layers made of a phosphor material and corresponding to individual colors are coated thereon and fired to form phosphor layers.

Next, the firing method employed in the above-described individual process steps, i.e., how to implement the firing method to form the transparent electrode and transparent dielectric layer on the front substrate, and the dielectric layer, barrier ribs and phosphor layers on the back substrate will be explained. As shown in FIG. 5, the substrate 11 is transported from the clean room (not shown) to the firing furnace 1. The substrate 11 is a glass substrate on which a paste layer is formed. The paste layer is made from powdered glass and vehicles which are made from resin binders and solvents, and the resin binders would be, for example, nitrocellulose, ethylcellulose, acrylic or the like, and the solvents would be, for example, terpinenol, acetic ester or the like.

In the firing furnace 1, the substrate carriers 6 transport the substrate 11 in the direction 12 at a constant speed. The substrate 11 first passes through the furnace compartment 5 located nearest to the upstream side within the firing furnace 1. Then, the substrate continues moving from one furnace compartment 5 to the subsequent furnace compartment 5 through the corresponding connection path 10 and as a result, passes through the temperature boosting section 2, temperature maintaining section 3 and cooling section 4 in this order. In the individual furnace compartments 5 of the temperature boosting section 2, the substrate 11 is heated from the room temperature to around the firing temperature T by the heating apparatus 14.

At this time, in the individual furnace compartments 5 of the temperature boosting section 2, dry air 13 is supplied via both end portions of the gas distribution piping 8 to the inside of the piping 8. The dry air 13 would be supplied, for example, at a rate of 400 N liters per minute at room temperature and atmospheric pressure (e.g., a temperature of 20° C. and a pressure of 1 atmosphere). The dry air 13 supplied to the inside of the gas distribution piping 8 is supplied to the inside of the furnace compartment 5 through the openings 15. In this case, the amounts of the dry air blowing out through the individual openings 15 become approximately equal to one another. The dry air 13 is supplied at a supply rate (gas distribution rate) of, for example, 0.5 to 10 meters per second, for example, 2 meters per second. The paste layer on the substrate 11 is exposed to the dry air 13 within the furnace compartment 5.

Thus, a part of the binders within the paste layer on the substrate 11 is burned off, producing water and carbonic anhydride which, in turn, are carried away by the dry air 13. Moreover, the remaining binders and the solvents are not burned off but evaporated and then carried away by the dry air 13. This allows the binders and solvents to be eliminated from the paste layer and further allows the dry air 13 to become air (contaminated air) containing water, carbonic anhydride, binder component and solvent component. This phenomenon occurs primarily in a temperature range of 300 to 450° C. Thereafter, the contaminated air flows from within the furnace compartment 5 to the inside of the gas exhaust piping 9 through the openings 17 of the gas exhaust piping 9 and is exhausted via both end portions of the gas exhaust piping 9. Thus, the contaminated air is exhausted from within the furnace compartment 5. In this case, the amounts of gas to be exhausted through the individual openings 17 of one piece of gas exhaust piping 9 become approximately equal to one another. The amount of gas to be exhausted by the gas exhaust piping 9 would be, for example, 500 to 600 N liters per minute at room temperature and atmospheric pressure.

Subsequently, the temperature maintaining section 3 maintains the substrate 11 at the firing temperature T and softens the powdered glass within the paste layer, and fires the paste layer. The firing temperature T would be, for example, 500 to 600° C. Then, the cooling section 4 cools the substrate 11 from the firing temperature T to a lower temperature.

The front substrate and back substrate manufactured through the above-described firing steps are piled on top of another so as to face each other. Then, the front substrate and back substrate are sealed together by heat treatment and discharge space formed between the front substrate and back substrate is exhausted, and the discharge space is filled with discharge gas. Thus, the PDP is manufactured.

In the embodiment, the openings 15 of the gas distribution piping 8 are constructed such that the opening becomes larger in directions from both end portions to the central portion of the gas distribution piping 8. Furthermore, the openings 17 of the gas exhaust piping 9 are constructed such that the opening becomes larger in directions from both end portions to the central portion of the gas exhaust piping 9. When the dry air 13 is supplied via both end portions of the gas distribution piping 8, friction or the like between the dry air 13 and the inner wall of the piping impedes gas flow. Moreover, when the dry air 13 flows out through the openings 15, pressure and gas flow speed within the piping become lower in directions from both end portions to the central portion of the gas distribution piping 8. However, when the openings 15 of the gas distribution piping 8 are constructed such that the opening becomes larger in directions from both end portions to the central portion of the gas distribution piping 8, the lowering of pressure and gas flow speed in the central portion of the piping is compensated for by increasing the size of the opening 15, allowing the amounts of the dry air 13 blowing out through the individual openings 15 to become equal to one another. As a result, the amount of the dry air 13 to be supplied to the inside of the firing furnace 1 becomes uniform in the longitudinal direction of the gas distribution piping 8, i.e., the width direction of the firing furnace 1, preventing occurrence of variations in the degree to which the paste layer formed on the substrate 11 of PDP is fired.

Furthermore, when the air (contaminated air) is exhausted via both end portions of the gas exhaust piping 9, since the air flows inside the piping through the openings 17, pressure difference between the inside and outside of the gas exhaust piping 9 becomes smaller in directions from both end portions to the central portion of the piping and flow speed of the contaminated air passing through the openings 17 becomes lower in directions from both end portions to the central portion of the piping. As a result, when the openings 17 of the same size are arranged at equal intervals along the longitudinal direction of the piping, the amount of air passing through the opening 17 located nearer to the central portion of the piping in the longitudinal direction of the piping becomes smaller. As a consequence, the amounts of air to be exhausted from the firing furnace become uneven in the longitudinal direction of the gas exhaust piping 9, causing variations in the degree to which the PDP is fired.

However, in the embodiment, since the openings 17 are configured so that the opening becomes larger in directions from both end portions to the central portion of the gas exhaust piping 9, the lowering of pressure difference and gas flow speed in the central portion of the piping is compensated for by increasing the size of the opening 17, allowing the amounts of the air blowing out through the individual openings 17 to become equal to one another. As a result, the amount of the air to be exhausted from within the firing furnace 1 becomes uniform in the longitudinal direction of the gas exhaust piping 9, i.e., the width direction of the firing furnace 1, preventing occurrence of variations in the degree to which the paste layer formed on the substrate of PDP is fired.

Furthermore, since the separator plate 16 is provided in the central portion of the gas exhaust piping 9, the amounts of gas to be exhausted through the individual openings 17 of the gas exhaust piping 9 can be made uniform in the width direction of the firing furnace 1.

Subsequently, a second embodiment of the invention will be explained below. FIG. 8A is a front view illustrating gas distribution piping of a firing furnace according to the embodiment and FIG. 8B is a front view illustrating gas exhaust piping of the firing furnace according to the embodiment. Difference between the firing furnaces of the embodiment and the aforementioned first embodiment is that the gas distribution piping and gas exhaust piping of the firing furnace of the embodiment have shapes different from those of the corresponding pipings of the first embodiment. The configuration of the firing furnace of the embodiment, excluding the above-described configuration, is the same as that of the firing furnace of the first embodiment.

As shown in FIGS. 8A and 8B, the firing furnace of the embodiment has gas distribution piping 18 and gas exhaust piping 19 provided therein, instead of the gas distribution piping 8 and gas exhaust piping 9 (refer to FIGS. 7A and 7B) of the firing furnace of the first embodiment. The gas distribution piping 18 and gas exhaust piping 19 each have a circular cross section. The gas distribution piping 18 has different cross section sizes depending on locations along the longitudinal direction of the piping, i.e., the diameter of the gas distribution piping 18 becomes smaller in a sequential fashion in directions from both end portions 18*a* to the central portion 18*b* of the gas distribution piping 18. That is, the central portion 18*b* of the gas distribution piping 18 is finer than both end portions 18*a* thereof. The diameter of each of both end portions 18*a* of the gas distribution piping 18 would be, for example, 50 millimeters and the diameter of the central portion 18*b* thereof would be, for example, 25 millimeters. Moreover, the gas distribution piping 18 has a plurality of openings 25 formed therein and arranged at equal intervals in a line along the longitudinal direction of the gas distribution piping 18. The openings 25 each have a shape of circle and have diameters equal to one another, and each have a diameter of, for example, 10 to 20 millimeters.

Likewise, the gas exhaust piping 19 is configured so that the diameter of the gas exhaust piping 19 becomes smaller in a sequential fashion in directions from both end portions 19*a* to the central portion 19*b* of the gas exhaust piping 19. The diameter of each of both end portions 19*a* of the gas exhaust piping 19 would be, for example, 50 millimeters and the diameter of the central portion 19*b* thereof would be, for example, 30 millimeters. Moreover, the gas exhaust piping 19 has a plurality of openings 27 formed therein and arranged at equal intervals in a line in the longitudinal direction of the gas exhaust piping 19. The openings 27 each have a shape of, for example, ellipse and have sizes equal to one another, and each have a minor diameter of, for example, 5 to 15 millimeters and a major diameter of, for example, 50 to 150 millimeters. Furthermore, the gas exhaust piping 19 has a separator plate 16 provided in the central portion 19*b* thereof.

In the embodiment, the gas distribution piping 18 is configured so that the diameter of the piping becomes smaller in directions from both end portions 18*a* to the central portion 18*b* of the piping. This allows the gas distribution piping 18 to compensate for lowering of pressure and gas flow speed in the central portion of the piping, which lowering occurs when dry air is supplied to a straight piping having openings from both end portions of the straight piping, by making the piping finer and then make pressure and gas flow speed constant in the longitudinal direction of piping within the piping. Thus, the dry air is able to blow out through the individual openings 25 in equal amount at equal speed. Additionally, since the gas exhaust piping 19 is configured so that the diameter of the piping becomes smaller in directions from both end portions 19*a* to the central portion 19*b* of the piping, the lowering of pressure difference between the inside and outside of the piping and gas flow speed in the central portion of the piping can be compensated for and the amounts of contaminated air passing through the individual openings 27 can be made equal to one another. As a result, the flow speed of dry air within the firing furnace and the amount of dry air to be supplied to the inside of the firing furnace become uniform in the width direction of the firing furnace, preventing occurrence of variations in the degree to which the paste layer formed on the substrate of PDP is fired.

Figure 9:
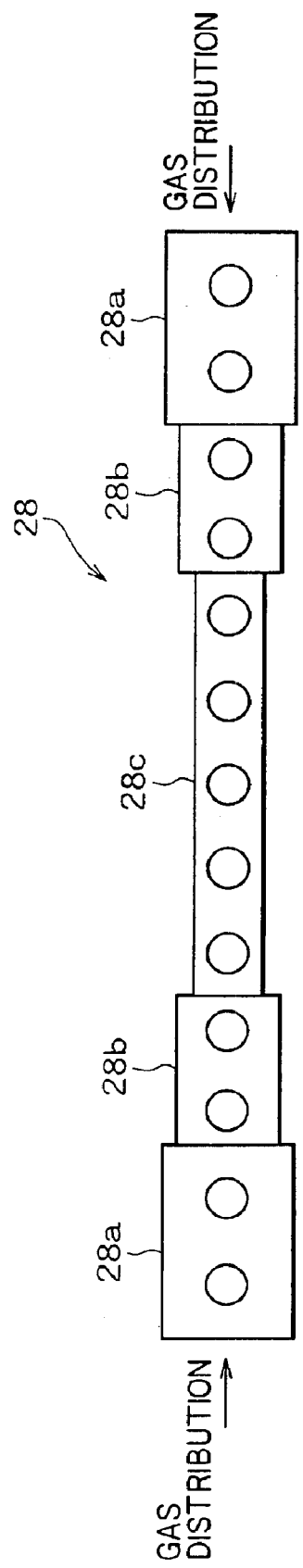
FIG. 9 is a front view illustrating gas distribution piping of the modification of the second embodiment.

Subsequently, modification of the aforementioned second embodiment will be explained. FIG. 9 is a front view illustrating gas distribution piping 28 of the modification. As shown in FIG. 9, the gas distribution piping 28 of the modification is configured so that the diameter of the piping becomes smaller in a stepwise fashion in directions from both end portions 28*a* to the central portion 28*c* of the piping. That is, the gas distribution piping 28 is formed so that an end portion 28*a,* intermediate portion 28*b,* central portion 28*c,* intermediate portion 28*b* and end portion 28*a* are coupled together in this order and the diameter of the intermediate portion 28*b* is smaller than that of the end portion 28*a,* and the diameter of the central portion 28*c* is smaller than that of the intermediate portion 28*b*. In the modification, similarly to the gas distribution piping 28, gas exhaust piping (not shown) is also configured so that the diameter of the piping becomes smaller in a stepwise fashion in directions from both end portions to the central portion of the piping. Note that the gas distribution piping 28 has a connection path penetrating the inside of the piping and provided between both end portions of the piping. The configuration of the firing furnace of the modification, excluding the above-described configuration, is the same as that of the firing furnace of the aforementioned second embodiment.

Since the firing furnace of the modification is configured so that the gas distribution piping and gas exhaust piping become finer in a stepwise fashion in directions from both end portions to the central portion of the piping, manufacture of gas distribution piping and gas exhaust piping becomes easier compared to manufacture of the corresponding pipings of the aforementioned second embodiment. That is, coupling together a plurality of straight pipings having diameters different from one another allows the gas distribution piping 28 to easily be manufactured. Note that the firing furnace may be constructed such that one of the gas distribution piping and gas exhaust piping becomes finer in a stepwise fashion in directions from both end portions to the central portion of the piping, as shown in FIG. 9, and the other becomes finer in a sequential fashion as shown in FIG. 8A or 8B.

Figure 10:
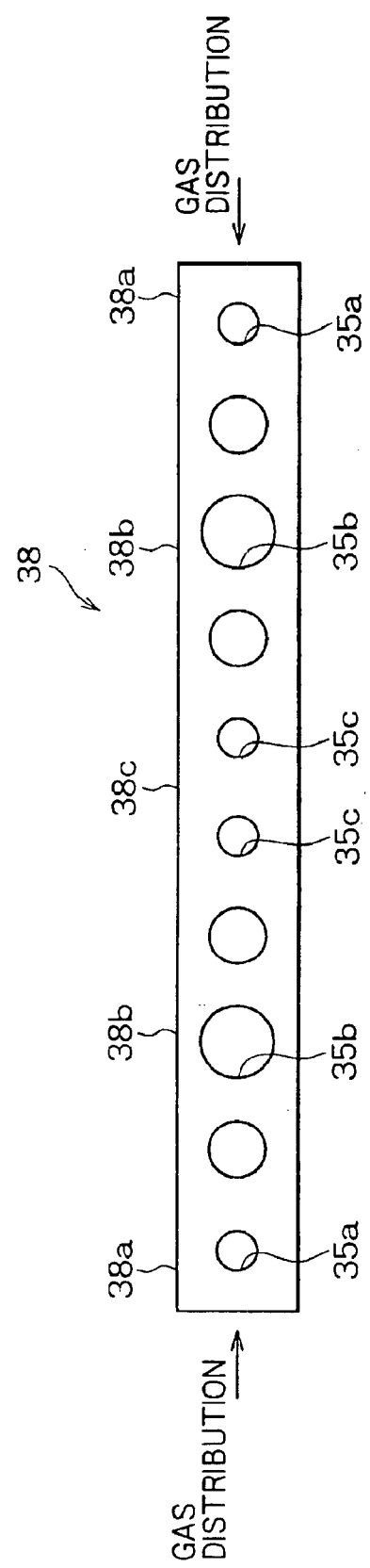
FIG. 10 is a front view illustrating gas distribution piping of a firing furnace according to a third embodiment of the invention.

Subsequently, a third embodiment of the invention will be explained below. FIG. 10 is a front view illustrating gas distribution piping of a firing furnace according to the embodiment. Difference between the firing furnaces of the embodiment and the aforementioned first embodiment is that the gas distribution piping of the embodiment has a shape different from that of the corresponding piping of the first embodiment. As shown in FIG. 10, the firing furnace of the embodiment has gas distribution piping 38 provided therein, instead of the gas distribution piping 8 (refer to FIG. 7A) of the firing furnace of the aforementioned first embodiment. The gas distribution piping 38 has a circular cross section and the same diameter in the longitudinal direction of the piping. Moreover, the gas distribution piping 38 has a plurality of openings 35 formed therein. The openings 35 each have a shape of circle and are arranged at approximately equal intervals in a line in the longitudinal direction of the gas distribution piping 38. The gas distribution piping 38 is formed so that an end portion 38a, intermediate portion 38b, central portion 38c, intermediate portion 38b and end portion 38a are coupled together in this order. The openings 35 are configured so that the opening becomes larger in directions from both end portions 38a to the intermediate portions 38b of the gas distribution piping 38 and becomes smaller in directions from the intermediate portions 38b to the central portion 38c. That is, the openings 35b formed in the intermediate portions 38b of the gas distribution piping 38 are larger than the openings 35a and 35c formed respectively in both end portions 38a and central portion 38c. The configuration of the firing furnace of the embodiment, excluding the above-described configuration, is the same as that of the firing furnace of the aforementioned first embodiment.

Subsequently, how the firing furnace constructed as described above and in accordance with the embodiment operates, i.e., a method of manufacturing a PDP will be explained. In the embodiment, the flow amount and flow speed of dry air to be supplied to the gas distribution piping 38 are made larger than those observed in the aforementioned first and second embodiments. In the embodiment, the amount of dry air to be supplied to individual furnace compartments would be, for example, 800 to 1500 N liters per minute at room temperature and atmospheric pressure, and the flow speed of dry air would be, for example, 15 to 30 meters per minute.

When the flow amount of dry air to be supplied to the gas distribution piping 38 is large or the flow speed of dry air to be supplied to the gas distribution piping 38 is high, the flows of dry airs having flowed from both end portions 38a of the gas distribution piping 38 to the inside of the piping collide at the central portion 38c, increasing the pressure at the central portion 38c. If the size of the openings is the same in the longitudinal direction of the gas distribution piping 38, the flow amount and flow speed of dry air flowing out through the openings formed in the central portion 38c become larger than the flow amount and flow speed of dry air flowing out through the openings formed in the intermediate portions 38b. As a result, the flow amount and flow speed of dry air flowing out through the openings formed in the intermediate portions 38b of the gas distribution piping 38 become smaller than the flow amount and flow speed of dry air flowing out through the openings formed in the central portion 38c and both end portions 38a.

In consideration of the above-mentioned phenomenon, the firing furnace of the embodiment is configured so that the openings 35b formed in the intermediate portions 38b of the gas distribution piping 38 are made larger than the openings 35a and 35c formed respectively in both end portions 38a and central portion 38c of the gas distribution piping 38 in order to compensate for the lowering of pressure and flow speed in the intermediate portions 38b by increasing the size of the openings, allowing the amounts of dry air flowing out through the individual openings 38 to become equal to one another. As a result, the amount of dry air to be supplied to the inside of the firing furnace becomes uniform in the width direction of the firing furnace.

Figure 11:
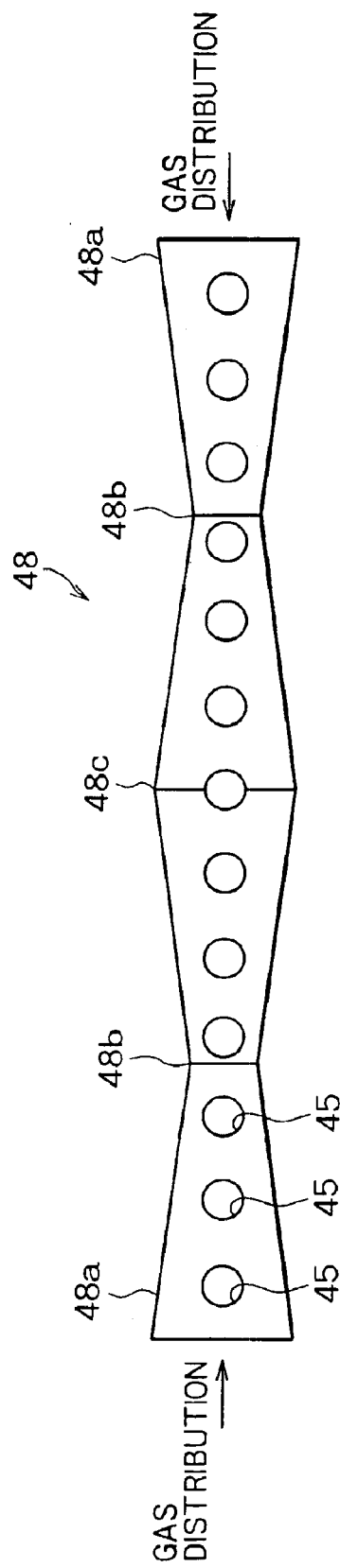
FIG. 11 is a front view illustrating gas distribution piping of a firing furnace according to a fourth embodiment of the invention.

Subsequently, a fourth embodiment of the invention will be explained below. FIG. 11 is a front view illustrating gas distribution piping of a firing furnace according to the embodiment. Difference between the firing furnaces of the embodiment and the aforementioned third embodiment is that the gas distribution piping of the embodiment has a shape different from that of the corresponding piping of the third embodiment.

As shown in FIG. 11, the firing furnace of the embodiment has gas distribution piping 48 provided therein, instead of the gas distribution piping 38 (refer to FIG. 10) of the firing furnace of the aforementioned third embodiment. The gas distribution piping 48 has a circular cross section. The gas distribution piping 48 has different cross section sizes depending on locations along the longitudinal direction of the piping. That is, the gas distribution piping 48 comprises an end portion 48a, intermediate portion 48b, central portion 48c, intermediate portion 48b and end portion 48a, in which the aforementioned individual portions are arranged in this order, the diameter of piping becomes smaller in a sequential fashion in a direction from the end portion 48a to intermediate portion 48b of the gas distribution piping 48, the diameter of piping becomes larger in a sequential fashion in a direction from the intermediate portion 48b to the central portion 48c thereof, the diameter of piping becomes smaller in a sequential fashion in a direction from the central portion 48c to the intermediate portion 48b thereof, and the diameter of piping becomes larger in a sequential fashion in a direction from the intermediate portion 48b to the end portion 48a thereof. Accordingly, the intermediate portions 48b of the gas distribution piping 48 are finer than both end portions 48a and the central portion 48c thereof. Both end portions 48a and the central portion 48c of the gas distribution piping 48 each would have a diameter of, for example, 50 millimeters and the intermediate portions 48b each would have a diameter of, for example, 30 millimeters. Note that the gas distribution piping 48 has a connection path penetrating the inside of the piping and provided between both end portions of the piping. Moreover, the gas distribution piping 48 has a plurality of openings 45 formed therein and arranged at equal intervals in a line along the longitudinal direction of the gas distribution piping 48. The openings 45 each have a shape of circle and have diameters equal to one another, and each have a diameter of, for example, 10 to 20 millimeters. The configuration of the firing furnace of the embodiment, excluding the above-described configuration, is the same as that of the firing furnace of the aforementioned first embodiment.

In the embodiment, the gas distribution piping 48 is configured so that the diameter of piping in the intermediate portions 48b is made smaller than the diameter of piping in both end portions 48a and the central portion 48c thereof. This allows the gas distribution piping 48 to compensate for lowering of pressure in the central portion of the piping, which lowering occurs when the diameter of piping is constant throughout the length of piping, and then make pressure uniform within the gas distribution piping 48. Therefore, the dry air is able to flow out through the individual openings 45 in equal amount at equal speed. As a result, the flow speed and amount of dry air to be supplied to the inside of the firing furnace become uniform in the width direction of the firing furnace, preventing occurrence of variations in the degree to which the paste layer formed on the substrate of PDP is fired.

Figure 12:
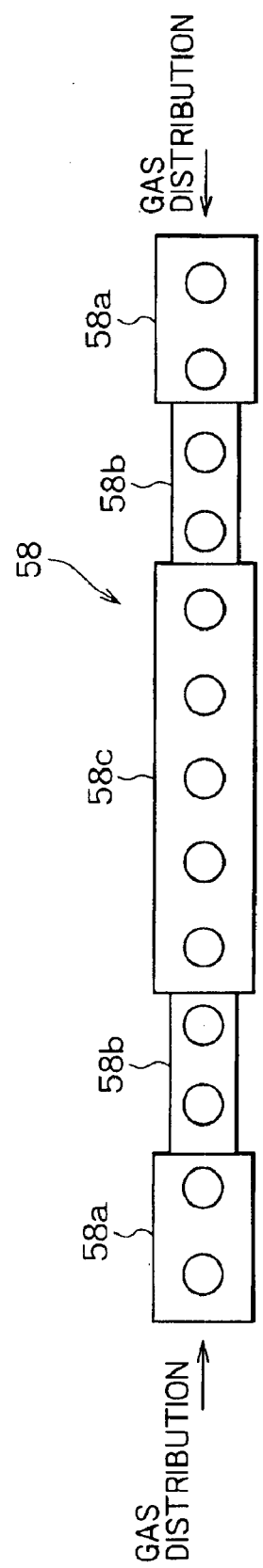
FIG. 12 is a front view illustrating gas distribution piping of the modification of the fourth embodiment.

Subsequently, modification of the aforementioned fourth embodiment will be explained. FIG. 12 is a front view illustrating gas distribution piping 58 of the modification. As shown in FIG. 12, the gas distribution piping 58 of the modification is configured so that the diameter of piping in intermediate portions 58b is smaller compared to the diameter of piping in both end portions 58a and a central portion 58c. Note that the gas distribution piping 58 has a connection path penetrating the inside of the piping and provided between both end portions of the piping. The configuration of the firing furnace of the modification, excluding the above-described configuration, is the same as that of the firing furnace of the aforementioned fourth embodiment.

In the modification, constructing the gas distribution piping 58 as described above makes it possible to produce beneficial effects similar to those obtained by employment of the aforementioned fourth embodiment and further facilitate manufacture of gas distribution piping. That is, coupling together a plurality of straight pipings having diameters different from one another allows the gas distribution piping 58 to easily be manufactured.

Figure 13:
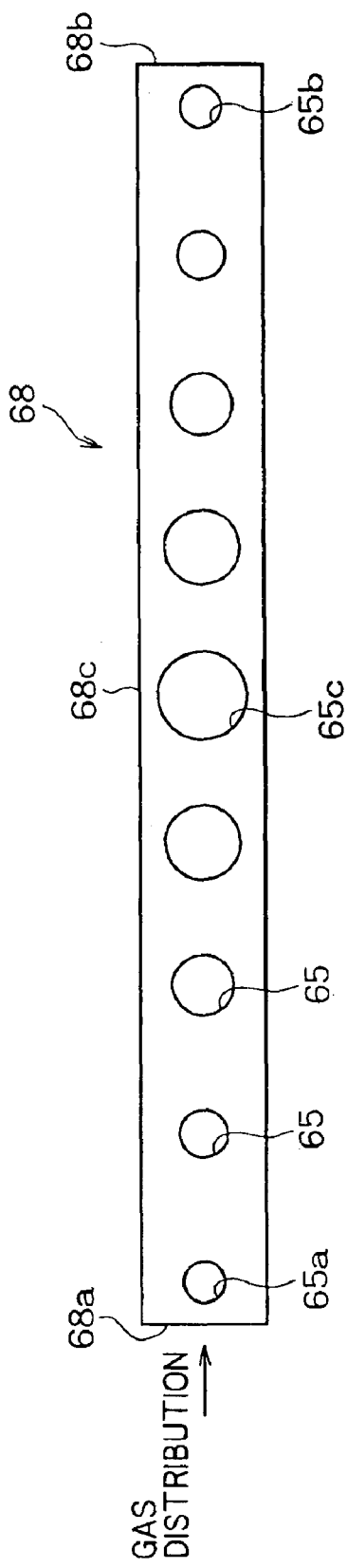
FIG. 13 is a front view illustrating gas distribution piping of a firing furnace according to a fifth embodiment of the invention.

Subsequently, a fifth embodiment of the invention will be explained below. FIG. 13 is a front view illustrating gas distribution piping of a firing furnace according to the embodiment. The firing furnace of the embodiment is different from those of the first to fourth embodiments in that dry air is supplied via one end portion of the gas distribution piping in the embodiment.

As shown in FIG. 13, the firing furnace of the embodiment has gas distribution piping 68 provided therein, instead of the gas distribution piping 8 (refer to FIG. 7A) of the firing furnace of the aforementioned first embodiment. The gas distribution piping 68 has a circular cross section and is formed to have a uniform diameter in the longitudinal direction of the piping. One end portion 68a of the gas distribution piping 68 is open and dry air is supplied via the one end portion 68a to the inside of the gas distribution piping 68. Furthermore, the other end portion 68b of the gas distribution piping 68 is closed.

Moreover, the gas distribution piping 68 has a plurality of openings 65 formed in the side face of the piping. The openings 65 are arranged at approximately equal intervals in a line along the longitudinal direction of the gas distribution piping 68. The openings 65 each have a shape of circle and the size of openings becomes different depending on locations along the longitudinal direction of the gas distribution piping 68. That is, the diameter of the opening 65 becomes larger in a direction from the end portion 68a to a portion 68c between the end portions 68a and 68b, and becomes smaller in a direction from the portion 68c to the end portion 68b. Accordingly, an opening 65c formed in the portion 68c is larger than openings 65a and 65b formed respectively in the end portions 68a and 68b. Note that the location of the portion 68c is not limited to a central portion of the gas distribution piping 68 in the longitudinal direction thereof but may vary depending on conditions such as the amount of dry air to be supplied. The configuration of the firing furnace of the embodiment, excluding the above-described configuration, is the same as that of the firing furnace of the aforementioned first embodiment.

In the embodiment, dry air is supplied via the one end portion 68a of the gas distribution piping 68 to the inside of the gas distribution piping 68. This eliminates the need to provide gas distribution piping systems (not shown) for supplying dry air to the gas distribution piping 68 on both sides of the firing furnace and allows the firing furnace to have one gas distribution piping system provided only on one side of the firing furnace, i.e., on the side of the end portion 68a of the gas distribution piping 68. As a result, the firing furnace can be made compact and investment cost of firing furnace can be reduced, and further, maintenance operation of firing furnace can be facilitated because a maintenance worker is able to carry out maintenance operation, beginning with the place where the gas distribution piping system is not provided.

Furthermore, when dry air is supplied only via the one end portion 68a of the gas distribution piping 68, the dry air flows out through the openings 65 provided in the halfway of the piping during its travel from the end portion 68a to end portion 68b and therefore, pressure loss occurs. On the other hand, pressure is increased in the end portion 68b within the piping because the dry air supplied impinges on the end portion 68b. As a consequence, pressure within the gas distribution piping 68 once becomes lower in a direction from the end portion 68a to end portion 68b and becomes lowest in the portion 68c between the end portions 68a and 68b, and becomes higher in a direction from the portion 68c to the end portion 68b. In the embodiment, the gas distribution piping is configured so that the opening 65 is made larger in directions from both end portions 68a and 68b to the portion 68c of the gas distribution piping in order to compensate for the lowering of pressure in the portion 68c within the piping, allowing the amounts of dry air blowing out through the individual openings 65 to become equal to one another.

Subsequently, modification of the aforementioned fifth embodiment will be explained. Although the openings are formed large in the portion 68c of the gas distribution piping 68 in the aforementioned fifth embodiment, instead, gas distribution piping is formed such that the diameter of the piping becomes small in the corresponding portion in the modification. In this case, openings of the piping are formed to become equal to one another in size. This suppresses the lowering of the amount of dry air blowing out through the openings in the portion 68c and allows the amounts of dry air blowing out through the individual openings to become equal to one another.

Figure 14:
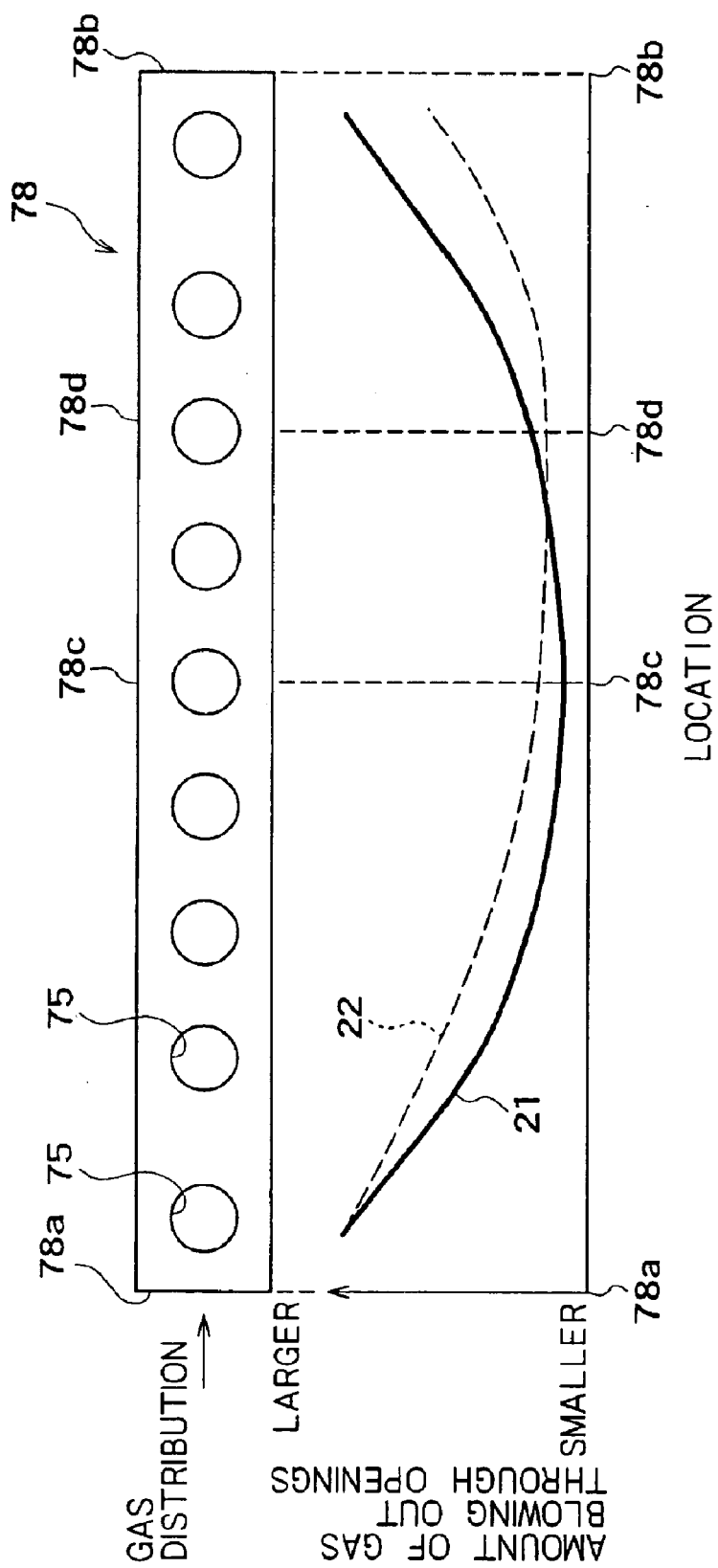
FIG. 14 illustrates a front view of gas distribution piping of a firing furnace of a comparative example and a graph diagram showing relationship between locations of dry air within the gas distribution piping and the amount of dry air flowing out through openings formed at the corresponding locations, in which axis of abscissas denotes locations of the gas distribution piping and axis of ordinate denotes the amount of dry air flowing out through openings formed at the corresponding locations.

Subsequently, a comparative example will be described to explain beneficial effects of the aforementioned fifth embodiment and its modification. FIG. 14 illustrates a front view of gas distribution piping of a firing furnace of the comparative example and a graph diagram showing relationship between locations of dry air within the gas distribution piping and the amount of dry air blowing out through openings formed at the corresponding locations, in which axis of abscissas denotes locations of the gas distribution piping and axis of ordinate denotes the amount of dry air blowing out through openings formed at the corresponding locations. As shown in FIG. 14, gas distribution piping 78 of the comparative example is configured so that one end portion 78a of the piping is open and dry air is supplied via the one end portion 78a to the inside of the gas distribution piping 78. Furthermore, the other end portion 78b of the gas distribution piping 78 is closed. The gas distribution piping 78 has a circular cross section whose diameter is uniform in the longitudinal direction of the gas distribution piping 78. Moreover, the gas distribution piping 78 has a plurality of openings 75 formed in a side face thereof. The openings 75 each have a shape of circle and have diameters equal to one another, and further, are arranged at equal intervals in a line in the longitudinal direction of the gas distribution piping 78.

The amounts of dry air blowing out through the individual openings 75 become larger in the end portions 78a and 78b, as denoted by a solid line 21 of FIG. 14, and become smallest in the portion 78c located between the end portions 78a and 78b. This is because, as described above, pressure within the piping becomes lower in a direction from the end portion 78a to the portion 78c, which phenomenon is caused by outflow of dry air through the openings, and further, the dry air supplied and impinging on the end portion 78b serves to increase pressure within the piping in a direction from the portion 78c to the end portion 78b. The above-described gas distribution piping 78 does not allow the dry air to blow out uniformly through the individual openings 75 and to be supplied to the inside of the firing furnace uniformly in the width direction of the firing furnace. Note that when conditions such as the flow amount of dry air to be supplied to the gas distribution piping 78 changes, distribution of the amounts of dry air blowing out through the openings 75 changes accordingly, as denoted by a broken line 22 of FIG. 14, and the amount of dry air blowing out through the opening located in a portion 78d whose position is different from that of the portion 78c becomes smallest.

Figure 15:
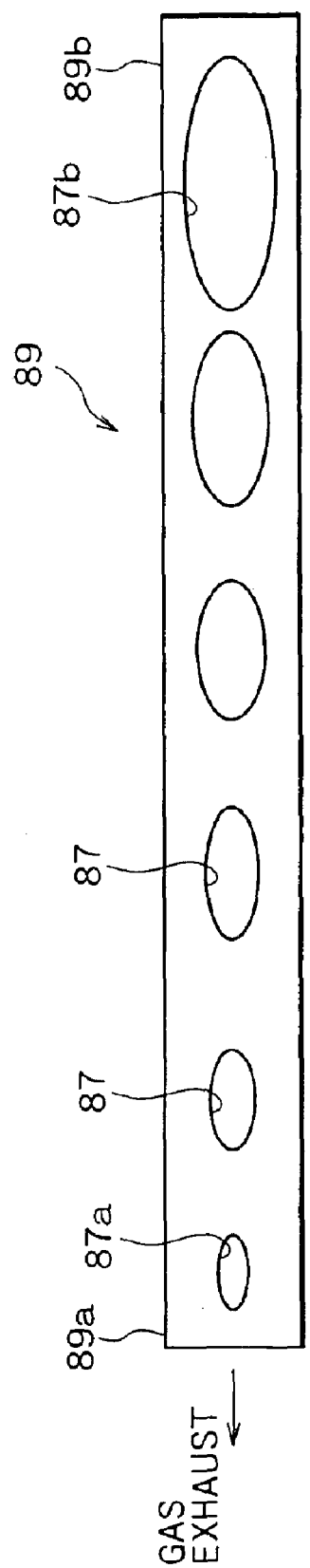
FIG. 15 is a front view illustrating gas exhaust piping of a firing furnace according to a sixth embodiment of the invention.

Subsequently, a sixth embodiment of the invention will be explained below. FIG. 15 is a front view illustrating gas exhaust piping of a firing furnace according to the embodiment. The firing furnace of the embodiment includes the configuration of the firing furnace of the aforementioned fifth embodiment and further is configured so that gas to be exhausted by gas exhaust piping is exhausted via one end portion of the piping.

As shown in FIG. 15, the firing furnace of the embodiment has gas exhaust piping 89 provided therein, instead of the gas exhaust piping of the firing furnace of the aforementioned fifth embodiment. The gas exhaust piping 89 has a circular cross section and is formed to have a uniform diameter in the longitudinal direction of the piping. One end portion 89a of the gas exhaust piping 89 is open and air (contaminated air) is exhausted from within the gas exhaust piping 89 through the end portion 89a. The other end portion 89b of the gas exhaust piping 89 is closed.

Furthermore, a plurality of openings 87 are formed in a side face of the gas exhaust piping 89. The openings 87 are arranged in a line along the longitudinal direction of the gas exhaust piping 89. The openings 87 each have a shape of ellipse and the sizes of the openings 87 vary depending on where the openings are located within the gas exhaust piping 89. That is, the opening 87 becomes larger in a direction from the end portion 89a to end portion 89b and the opening 87b formed in the end portion 89b is larger than the opening 87a formed in the end portion 89a. The configuration of the firing furnace of the embodiment, excluding the above-described configuration, is the same as that of the firing furnace of the aforementioned fifth embodiment.

In the embodiment, gas is exhausted from within the gas exhaust piping 89 through the one end portion 89a of the gas exhaust piping 89. This eliminates the need to provide gas exhaust piping systems on both sides of the firing furnace and allows the firing furnace to have one gas exhaust piping system provided only on one side of the firing furnace. That is, in the embodiment, both the gas distribution piping system and the gas exhaust piping system may be provided respectively on one side and the other side of the firing furnace. As a result, the firing furnace can be made further compact and investment cost of firing furnace can be further reduced, and further, maintenance operation of firing furnace can be further facilitated compared to the firing furnace of the aforementioned fifth embodiment.

In accordance with the same principle as that applied to the aforementioned first embodiment, when air is exhausted via the end portion of the gas exhaust piping 89, the air flows inside the piping through the openings 87 and therefore, pressure difference between the inside and outside of the gas exhaust piping 89 becomes smaller in a direction from the end portion 89a to end portion 89b of the piping and flow speed of air passing through the openings 87 becomes lower in a direction from the end portion 89a to end portion 89b of the piping. In consideration of the above-mentioned phenomenon, the firing furnace of the embodiment is configured so that the opening 87 is made larger in a direction from the end portion 89a to end portion 89b of the gas exhaust piping 89. This compensates for the lowering of pressure difference and flow speed of air in the vicinity of the end portion 89b, allowing the amounts of air to be exhausted through the individual openings 87 to become equal to one another. As a result, the amounts of contaminated air to be exhausted from within the firing furnace become uniform in the width direction of the firing furnace, preventing occurrence of variations in the degree to which the paste layer formed on the substrate of PDP is fired.

Figure 16:
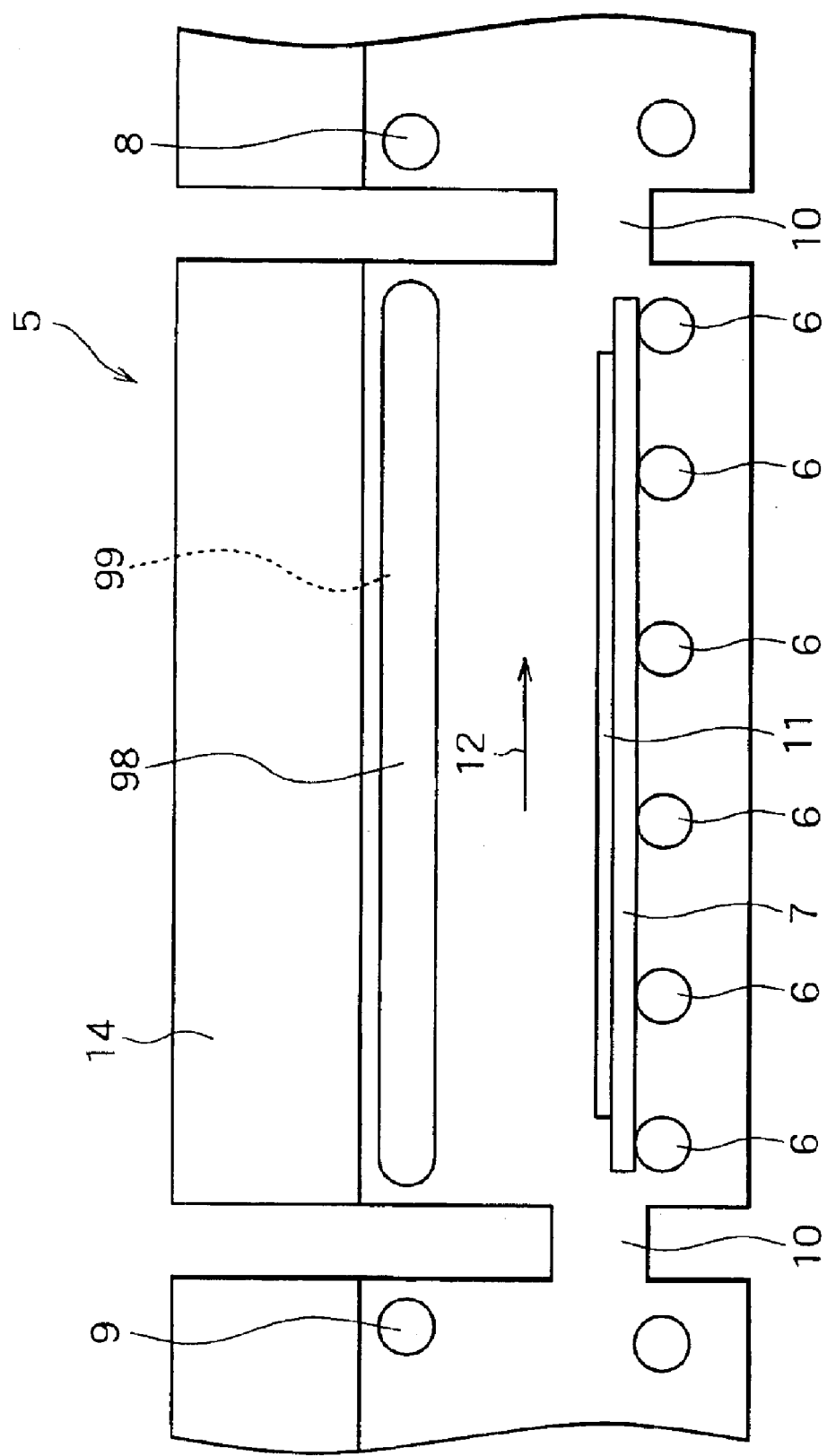
FIG. 16 is a schematic cross sectional view illustrating individual furnace compartments within a firing furnace of a seventh embodiment of the invention.

Subsequently, a seventh embodiment of the invention will be explained below. FIG. 16 is a schematic cross sectional view illustrating individual furnace compartments within a firing furnace of the seventh embodiment. Note that in FIG. 16, the same signs and numerals as those attached to the components illustrated in FIG. 6 are attached to constitutive components of FIG. 16 and the detailed explanation of those components of FIG. 16 is omitted. Although the firing furnace (refer to FIG. 6) of the aforementioned first embodiment is configured so that the gas distribution piping 8 and gas exhaust piping 9 are provided in such a manner that the longitudinal direction of those pipings is orthogonal to the direction 12 in which the substrate is transported, the firing furnace of the embodiment is configured so that gas distribution piping 98 and gas exhaust piping 99 are provided in such a manner that the gas distribution piping 98 and gas exhaust piping 99 are laid to extend in a direction 12, i.e., the longitudinal direction of those pipings, in which a substrate is transported, as shown in FIG. 16. That is, the firing furnace of the embodiment is configured so that one gas distribution piping 98 is provided in one side portions within individual furnace compartments 5 so as to align the longitudinal direction of the piping 98 with the direction 12 and one gas exhaust piping 99 is provided in the other side portions within the individual furnace compartments 5 so as to align the longitudinal direction of the piping 99 with the direction 12. Additionally, both end portions of the gas distribution piping 98 are coupled to a dry air supply apparatus (not shown) via a gas distribution piping system (not shown) provided on one side of the firing furnace 1 and both end portions of the gas exhaust piping 99 are coupled to a gas exhaust pump (not shown) via a gas exhaust piping system (not shown) provided on the other side of the firing furnace 1. The configurations of the gas distribution piping 98 and gas exhaust piping 99 are the same as, for example, those shown in FIGS. 7A and 7B. The configuration and operation of the firing furnace of the embodiment, excluding the above-described configuration and operation, are the same as those of the firing furnace of the aforementioned first embodiment.

In the embodiment, since the gas distribution piping 98 and gas exhaust piping 99 are provided on both sides of the furnace compartments 5, the gas distribution piping system and gas exhaust piping system can be disposed separately on one side and the other side of the firing furnace 1, eliminating the need to provide both the gas distribution piping system and the gas exhaust piping system on both sides of the firing furnace 1, and therefore, achieving less space for piping systems. Beneficial effects of the embodiment, excluding the above-described beneficial effects, are the same as those of the aforementioned first embodiment.

It should be appreciated that in the embodiment, the shape of gas distribution piping 98 and gas exhaust piping 99, and the arrangement and shape of the openings formed in those pipings may be the same as those employed in one of the second to fourth embodiments. Moreover, similarly to the fifth or sixth embodiment, gas distribution from one side of gas distribution piping and/or gas exhaust from one side of gas exhaust piping may be employed in the embodiment. In this case, the shape of gas distribution piping and gas exhaust piping, and the arrangement and shape of openings formed in those pipings are to be the same as those employed in the aforementioned fifth or sixth embodiment.

It should be noted that in the aforementioned individual embodiments, a fundamental concept of how the shape of gas distribution piping and gas exhaust piping, and the shape and size of openings formed in those pipings should be implemented has been disclosed, however the detailed shape and dimensions of the above-stated constitutive components vary depending on conditions such as flow amount and flow speed of dry air, and the amount and speed of dry air to be exhausted from within a firing furnace, and therefore, need to optimally be designed to meet those conditions. Moreover, in the aforementioned individual embodiments, the exemplary piping having a circular cross section is shown, however the piping according to the invention is not limited thereto but may have, for example, an ellipse or rectangle cross section. Additionally, the openings according to the invention are not limited to have a shape of circle and ellipse, but may have a shape of another figure such as rectangle. Still furthermore, in the aforementioned individual embodiments, the technique for adjusting the size of openings or the size of cross section of piping to equalize the amounts of gas passing through the individual openings has been disclosed, however a technique for adjusting spacing between the openings while keeping constant the size of openings and the size of cross section of piping to equalize the amounts of gas passing through the individual openings may be employed in the invention. That is, openings are formed with lower density in portions where pressure within a piping becomes high and formed with higher density in portions where the pressure becomes low, thereby equalizing the amounts of gas passing through the individual openings.

What is claimed is:

1. A PDP firing furnace for firing a substrate of plasma display panel, comprising:

gas distribution piping laid in one direction within said firing furnace and having a plurality of openings arranged along said one direction, said gas distribution piping being further constructed such that gas containing oxygen is supplied via both end portions of said gas distribution piping and said gas is supplied to an inside of said firing furnace through said openings; and gas exhaust piping for exhausting gas from within said firing furnace, said firing furnace being further constructed such that said openings become larger in directions from both end portions to a central portion of said gas distribution piping, or said gas distribution piping becomes finer in directions from said both end portions to said central portion of said gas distribution piping.

2. The PDP firing furnace according to claim 1, wherein said gas distribution piping has a separator plate in said central portion of said gas distribution piping.

3. A PDP firing furnace for firing a substrate of plasma display panel, comprising:

gas distribution piping laid in one direction within said firing furnace and having a plurality of openings arranged along said one direction, said gas distribution piping being further constructed such that gas containing oxygen is supplied via both end portions of said gas distribution piping and said gas is supplied to an inside of said firing furnace through said openings; and gas exhaust piping for exhausting gas from within said firing furnace, said firing furnace being further constructed such that said openings formed between both end portions and a central portion of said gas distribution piping are larger than said openings formed in said both end portions and central portion, or portions of said gas distribution piping between said both end portions and central portion become finer than said both end portions and central portion of said gas distribution piping.

4. The PDP firing furnace according to claim 3, wherein said gas distribution piping has a separator plate in said central portion of said gas distribution piping.

5. A PDP firing furnace for firing a substrate of plasma display panel, comprising:

gas distribution piping laid in one direction within said firing furnace and having a plurality of openings arranged along said one direction, said gas distribution piping being further constructed such that gas containing oxygen is supplied via one end portion of said gas distribution piping and said gas is supplied to an inside of said firing furnace through said openings; and gas exhaust piping for exhausting gas from within said firing furnace, said firing furnace being further constructed such that said openings become larger in directions from both end portions of said gas distribution piping to a portion between said both end portions, or said gas distribution piping becomes finer in directions from said both end portions of said gas distribution piping to said portion between said both end portions.

6. The PDP firing furnace according to claim 5, wherein said gas distribution piping has a separator plate in said central portion of said gas distribution piping.

7. A PDP firing furnace for firing a substrate of plasma display panel, comprising:

gas distribution piping for supplying gas containing oxygen to an inside of said firing furnace; and gas exhaust piping laid in one direction within said firing furnace and having a plurality of openings arranged along said one direction, said gas exhaust piping being further constructed such that gas is exhausted via both end portions of said gas exhaust piping to exhaust gas from within said firing furnace through said openings, said firing furnace being further constructed such that said openings become larger in directions from both end portions to a central portion of said gas exhaust piping, or said gas exhaust piping becomes finer in directions from said both end portions to central portion of said gas exhaust piping.

8. The PDP firing furnace according to claim 7, wherein said gas exhaust piping has a separator plate in said central portion of said gas exhaust piping.

9. A PDP firing furnace for firing a substrate of plasma display panel, comprising:

gas distribution piping for supplying gas containing oxygen to an inside of said firing furnace; and gas exhaust piping laid in one direction within said firing furnace and having a plurality of openings arranged along said one direction, said gas exhaust piping being further constructed such that gas is exhausted via both end portions of said gas exhaust piping to exhaust gas from within said firing furnace through said openings, said firing furnace being further constructed such that said openings formed between both end portions and a central portion of said gas exhaust piping are larger than said openings formed in said both end portions and central portion, or portions of said gas exhaust piping between said both end portions and central portion are finer than said both end portions and central portion of said gas exhaust piping.

10. The PDP firing furnace according to claim 9, wherein said gas exhaust piping has a separator plate in said central portion of said gas exhaust piping.

11. A PDP firing furnace for firing a substrate of plasma display panel, comprising:

gas distribution piping for supplying gas containing oxygen to an inside of said firing furnace; and gas exhaust piping laid in one direction within said firing furnace and having a plurality of openings arranged along said one direction, said gas exhaust piping being further constructed such that gas is exhausted via both end portions of said gas exhaust piping to exhaust gas from within said firing furnace through said openings, said firing furnace being further constructed such that said openings become larger in directions from both end portions of said gas exhaust piping to a portion between said both end portions, or said gas exhaust piping becomes finer in directions from said both end portions of said gas exhaust piping to said portion between said both end portions.

12. The PDP firing furnace according to claim 11, wherein said gas exhaust piping has a separator plate in said central portion of said gas exhaust piping.

13. A PDP firing furnace for firing a substrate of plasma display panel, comprising:

gas distribution piping laid in one direction within said firing furnace and having a plurality of openings arranged along said one direction, said gas distribution piping being further constructed such that gas containing oxygen is supplied via one end portion of said gas distribution piping and said gas is supplied to an inside of said firing furnace through said openings; and gas exhaust piping for exhausting gas from within said firing furnace, said firing furnace being further constructed such that said openings become larger in directions from both end portions of said gas distribution piping to a portion between said both end portions, or said gas distribution piping becomes finer in directions from said both end portions of said gas distribution piping to said portion between said both end portions.

14. A PDP firing furnace for firing a substrate of plasma display panel, comprising:

gas distribution piping for supplying gas containing oxygen to an inside of said firing furnace; and gas exhaust piping laid in one direction within said firing furnace and having a plurality of openings arranged along said one direction, said gas exhaust piping being further constructed such that gas is exhausted via one end portion of said gas exhaust piping to exhaust gas from within said firing furnace through said openings, said firing furnace being further constructed such that said openings become larger in a direction from said one end portion, through which said gas is exhausted, to the other end portion of said gas exhaust piping, or said gas exhaust piping becomes finer in a direction from said one end portion, through which said gas is exhausted, to the other end portion of said gas exhaust piping.

15. The PDP firing furnace according to claim 1, wherein said openings have a shape of circle, ellipse or rectangle.

16. The PDP firing furnace according to claim 1, further comprising:

a carrier unit for transporting said substrate;

a plurality of furnace compartments arranged along a direction of movement of said substrate and allowing said substrate to pass sequentially through an inside of said furnace compartments; and a heating unit for heating said substrate, wherein said gas distribution piping and gas exhaust piping are laid in a direction orthogonal to said direction of movement of said substrate or in the same direction as said direction of movement of said substrate within said firing furnace.

17. A method of manufacturing a plasma display panel, comprising the steps of:

forming a paste layer made of a transparent conductive material on a first substrate and firing said paste layer to form a transparent electrode;

forming a paste layer made of a transparent dielectric material over said transparent electrode and firing said paste layer to form a transparent dielectric layer;

forming electrodes on a second substrate;

forming a paste layer made of a dielectric material over said electrodes and firing said paste layer to form a dielectric layer;

forming a paste layer made of a barrier rib material on said dielectric layer and firing said paste layer to form barrier ribs; and forming a paste layer made of a phosphor material on at least one of said dielectric layer and side faces of said barrier ribs and firing said paste layer to form phosphor layers, said method being further constructed such that in at least one of the step of forming said transparent electrode, the step of forming said transparent dielectric layer, the step of forming said dielectric layer, the step of forming said barrier ribs, and the step of forming said phosphor layers, said firing of said paste layer is carried out within the firing furnace described in claim 1.

18. A method of manufacturing a plasma display panel, comprising the steps of:

forming a paste layer made of a transparent conductive material on a first substrate and firing said paste layer to form a transparent electrode;

forming a paste layer made of a transparent dielectric material over said transparent electrode and firing said paste layer to form a transparent dielectric layer;

forming electrodes on a second substrate;

forming a paste layer made of a dielectric material over said electrodes and firing said paste layer to form a dielectric layer;

forming a paste layer made of a barrier rib material on said dielectric layer and firing said paste layer to form barrier ribs; and forming a paste layer made of a phosphor material on at least one of said dielectric layer and side faces of said barrier ribs and firing said paste layer to form phosphor layers, said method being further constructed such that in at least one of the step of forming said transparent electrode, the step of forming said transparent dielectric layer, the step of forming said dielectric layer, the step of forming said barrier ribs, and the step of forming said phosphor layers, said firing of said paste layer is carried out within the firing furnace described in claim 3.

19. A method of manufacturing a plasma display panel, comprising the steps of:

forming a paste layer made of a transparent conductive material on a first substrate and firing said paste layer to form a transparent electrode;

forming a paste layer made of a transparent dielectric material over said transparent electrode and firing said paste layer to form a transparent dielectric layer;

forming electrodes on a second substrate;

forming a paste layer made of a dielectric material over said electrodes and firing said paste layer to form a dielectric layer;

forming a paste layer made of a barrier rib material on said dielectric layer and firing said paste layer to form barrier ribs; and forming a paste layer made of a phosphor material on at least one of said dielectric layer and side faces of said barrier ribs and firing said paste layer to form phosphor layers, said method being further constructed such that in at least one of the step of forming said transparent electrode, the step of forming said transparent dielectric layer, the step of forming said dielectric layer, the step of forming said barrier ribs, and the step of forming said phosphor layers, said firing of said paste layer is carried out within the firing furnace described in claim 5.

20. A method of manufacturing a plasma display panel, comprising the steps of:

forming a paste layer made of a transparent conductive material on a first substrate and firing said paste layer to form a transparent electrode;

forming a paste layer made of a transparent dielectric material over said transparent electrode and firing said paste layer to form a transparent dielectric layer;

forming electrodes on a second substrate;

forming a paste layer made of a dielectric material over said electrodes and firing said paste layer to form a dielectric layer;

forming a paste layer made of a barrier rib material on said dielectric layer and firing said paste layer to form barrier ribs; and forming a paste layer made of a phosphor material on at least one of said dielectric layer and side faces of said barrier ribs and firing said paste layer to form phosphor layers, said method being further constructed such that in at least one of the step of forming said transparent electrode, the step of forming said transparent dielectric layer, the step of forming said dielectric layer, the step of forming said barrier ribs, and the step of forming said phosphor layers, said firing of said paste layer is carried out within the firing furnace described in claim 7.

21. A method of manufacturing a plasma display panel, comprising the steps of:

forming a paste layer made of a transparent conductive material on a first substrate and firing said paste layer to form a transparent electrode;

forming a paste layer made of a transparent dielectric material over said transparent electrode and firing said paste layer to form a transparent dielectric layer;

forming electrodes on a second substrate;

forming a paste layer made of a dielectric material over said electrodes and firing said paste layer to form a dielectric layer;

forming a paste layer made of a barrier rib material on said dielectric layer and firing said paste layer to form barrier ribs; and forming a paste layer made of a phosphor material on at least one of said dielectric layer and side faces of said barrier ribs and firing said paste layer to form phosphor layers, said method being further constructed such that in at least one of the step of forming said transparent electrode, the step of forming said transparent dielectric layer, the step of forming said dielectric layer, the step of forming said barrier ribs, and the step of forming said phosphor layers, said firing of said paste layer is carried out within the firing furnace described in claim 9.

22. A method of manufacturing a plasma display panel, comprising the steps of:

forming a paste layer made of a transparent conductive material on a first substrate and firing said paste layer to form a transparent electrode;

forming a paste layer made of a transparent dielectric material over said transparent electrode and firing said paste layer to form a transparent dielectric layer;

forming electrodes on a second substrate;

forming a paste layer made of a dielectric material over said electrodes and firing said paste layer to form a dielectric layer;

forming a paste layer made of a barrier rib material on said dielectric layer and firing said paste layer to form barrier ribs; and forming a paste layer made of a phosphor material on at least one of said dielectric layer and side faces of said barrier ribs and firing said paste layer to form phosphor layers, said method being further constructed such that in at least one of the step of forming said transparent electrode, the step of forming said transparent dielectric layer, the step of forming said dielectric layer, the step of forming said barrier ribs, and the step of forming said phosphor layers, said firing of said paste layer is carried out within the firing furnace described in claim 11.

23. A method of manufacturing a plasma display panel, comprising the steps of:

forming a paste layer made of a transparent conductive material on a first substrate and firing said paste layer to form a transparent electrode;

forming a paste layer made of a transparent dielectric material over said transparent electrode and firing said paste layer to form a transparent dielectric layer;

forming electrodes on a second substrate;

forming a paste layer made of a dielectric material over said electrodes and firing said paste layer to form a dielectric layer;

forming a paste layer made of a barrier rib material on said dielectric layer and firing said paste layer to form barrier ribs; and forming a paste layer made of a phosphor material on at least one of said dielectric layer and side faces of said barrier ribs and firing said paste layer to form phosphor layers, said method being further constructed such that in at least one of the step of forming said transparent electrode, the step of forming said transparent dielectric layer, the step of forming said dielectric layer, the step of forming said barrier ribs, and the step of forming said phosphor layers, said firing of said paste layer is carried out within the firing furnace described in claim 13.

24. A method of manufacturing a plasma display panel, comprising the steps of:

forming a paste layer made of a transparent conductive material on a first substrate and firing said paste layer to form a transparent electrode;

forming a paste layer made of a transparent dielectric material over said transparent electrode and firing said paste layer to form a transparent dielectric layer;

forming electrodes on a second substrate;

forming a paste layer made of a dielectric material over said electrodes and firing said paste layer to form a dielectric layer;

forming a paste layer made of a barrier rib material on said dielectric layer and firing said paste layer to form barrier ribs; and forming a paste layer made of a phosphor material on at least one of said dielectric layer and side faces of said barrier ribs and firing said paste layer to form phosphor layers, said method being further constructed such that in at least one of the step of forming said transparent electrode, the step of forming said transparent dielectric layer, the step of forming said dielectric layer, the step of forming said barrier ribs, and the step of forming said phosphor layers, said firing of said paste layer is carried out within the firing furnace described in claim 14.

* * * * *